US011330657B2

(12) United States Patent
Futaki

(10) Patent No.: US 11,330,657 B2
(45) Date of Patent: May 10, 2022

(54) RADIO ACCESS NETWORK NODE, RADIO TERMINAL, AND METHODS THEREFOR

(71) Applicant: NEC CORPORATION, Tokyo (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 11 days.

(21) Appl. No.: 16/615,657

(22) PCT Filed: Jan. 24, 2018

(86) PCT No.: PCT/JP2018/002041
§ 371 (c)(1),
(2) Date: Nov. 21, 2019

(87) PCT Pub. No.: WO2018/230027
PCT Pub. Date: Dec. 20, 2018

(65) Prior Publication Data
US 2020/0154499 A1    May 14, 2020

(30) Foreign Application Priority Data

Jun. 15, 2017    (JP) .............................. JP2017-118095

(51) Int. Cl.
*H04W 76/16* (2018.01)
*H04W 8/22* (2009.01)
*H04W 16/32* (2009.01)

(52) U.S. Cl.
CPC .............. *H04W 76/16* (2018.02); *H04W 8/22* (2013.01); *H04W 16/32* (2013.01)

(58) Field of Classification Search
CPC ........ H04W 76/16; H04W 16/32; H04W 8/22

USPC .......... 370/328, 329, 331–332; 455/436–439
See application file for complete search history.

(56) References Cited

U.S. PATENT DOCUMENTS

| 9,867,096 | B2* | 1/2018 | Susitaival | H04W 72/0413 |
| 10,306,536 | B2* | 5/2019 | Jia | H04L 5/0098 |
| 10,638,377 | B2* | 4/2020 | Futaki | H04W 36/18 |
| 10,721,118 | B2* | 7/2020 | Hong | H04W 76/15 |

(Continued)

FOREIGN PATENT DOCUMENTS

| CN | 104396302 A | 3/2015 |
| CN | 104885516 A | 9/2015 |

(Continued)

OTHER PUBLICATIONS

KDDI Corporation, "Protocol stacks of dual connectivity solutions targeting the avoidance of frequent handovers", 3GPP TSG RAN WG2 Meeting #81bis, R2-131192, Apr. 15-Apr. 19, 2013, pp. 1-6, Chicago, USA.

(Continued)

*Primary Examiner* — Congvan Tran
(74) *Attorney, Agent, or Firm* — Sughrue Mion, PLLC

(57) ABSTRACT

A master RAN node (1) associated with a master RAT (1) communicates with a secondary RAN node (2) associated with a secondary RAT and provides a radio terminal (3) with dual connectivity that uses the master RAT and the secondary RAT. In response to receiving, from the radio terminal (3) or a core network (4), terminal capability information indicating that the radio terminal (3) supports the split bearer, the master RAN node (1) uses a PDCP entity, which provides unified PDCP functionalities, for a master cell group split bearer for the radio terminal (3).

20 Claims, 15 Drawing Sheets

(56) References Cited

U.S. PATENT DOCUMENTS

| | | | |
|---|---|---|---|
| 10,952,116 B2* | 3/2021 | Chen | H04W 36/24 |
| 2015/0271726 A1 | 9/2015 | Kim et al. | |
| 2016/0094446 A1 | 3/2016 | Kazmi et al. | |
| 2016/0212775 A1 | 7/2016 | Xu et al. | |
| 2016/0337909 A1 | 11/2016 | Cai | |
| 2017/0273125 A1* | 9/2017 | Teyeb | H04W 76/15 |
| 2018/0192331 A1* | 7/2018 | Masini | H04W 36/0033 |
| 2018/0262930 A1* | 9/2018 | da Silva | H04W 4/24 |
| 2018/0332649 A1* | 11/2018 | Fan | H04W 92/24 |
| 2019/0132713 A1* | 5/2019 | Xu | G06F 7/10 |
| 2019/0174311 A1* | 6/2019 | Hayashi | H04W 12/0431 |
| 2019/0230551 A1* | 7/2019 | Vikberg | H04W 28/0226 |
| 2019/0268814 A1* | 8/2019 | Hannu | H04W 36/0069 |
| 2019/0281580 A1* | 9/2019 | Rune | H04W 68/005 |
| 2020/0053809 A1* | 2/2020 | Axelsson | H04L 9/0819 |

FOREIGN PATENT DOCUMENTS

| | | | |
|---|---|---|---|
| CN | 105917727 A | 8/2016 | |
| KR | 10-2016-0037212 A | 4/2016 | |
| KR | 10-2016-0101017 A | 8/2016 | |
| KR | 10-2016-0110345 A | 9/2016 | |
| KR | 1020160136398 A | 11/2016 | |
| KR | 10-2017-0012464 A | 2/2017 | |
| WO | 2014/110810 A1 | 7/2014 | |
| WO | 2016119243 A1 | 8/2016 | |
| WO | 2016/138798 A1 | 9/2016 | |

OTHER PUBLICATIONS

Ericsson, "Bearer type switching in dual connectivity", 3GPP TSG-RAN WG2 #98, Tdoc R2-1704415, ISth—May 19, 2017, pp. 1-6, Hangzhou, China.

NTT Docomo, Inc., "Further analysis of unified split bearer—NW aspects", 3GPP TSG-RAN WG2 #98, R2-1704152, May 15-19, 2017, pp. 1-7, Hangzhou, China.

Ericsson, "On the different bearer options", 3GPP TSG-RAN WG2 98, Tdoc R2-1704414, May 15-19, 2017, pp. 1-3, Hangzhou, China.

International Search Report of PCT/JP2018/002041 dated Feb. 27, 2018 [PCT/ISA/210].

ZTE, "Consideration on the necessity of unified PDCP version for SRB", R2-1708132, 3GPP TSG-RAN WG2 Meeting #99, Aug. 21-25, 2017, pp. 1-3.

Intel Corporation, "RRC aspects of unifying split bearer types", R2-1704798, 3GPP TSG-RAN WG2 Meeting #98, May 15-19, 2017, pp. 1-5.

Communication dated Jun. 12, 2020 by the European Patent Office in application No. 18816882.7.

Communication dated Aug. 20, 2020, issued by the Korean Intellectual Property Office in Korean Application No. 10-2019-7036647.

Japanese Office Action for JP Application No. 2019-525058 dated Jan. 12, 2021 with English Translation.

Korean Office Action for KR Application No. 10-2021-7012629 dated May 4, 2021 with English Translation.

Chinese Office Action for CN Application No. 201880039415.6 dated Jan. 4, 2022 with English Translation.

Kazuaki Takeda, Status Report of WI on New Radio Access Technology, 3GPP TSG RAN meeting #76, RP-171137, May 29, 2017, USA, pp. 1/218-218/218.

Korean Office Action for KR Application No. 10-2021-7912629 dated Mar. 22, 2022 with English Translation.

Nokia et al., R2-1704345, UE capability structure and coordination aspects for LTE/NR DC, 3GPP TSG RAN WG2 #98, May 15-19, 2017.

* cited by examiner

| DC TYPE | SRB TYPE | DRB TYPE |
| --- | --- | --- |
| EN-DC | MCG SRB<br>MCG SPLIT SRB<br>SCG SRB | MCG BEARER<br>MCG SPLIT BEARER<br>SCG BEARER<br>SCG SPLIT BEARER |
| NE-DC | MCG SRB<br>MCG SPLIT SRB<br>SCG SRB | MCG BEARER<br>MCG SPLIT BEARER<br>SCG BEARER |
| NG-EN-DC | MCG SRB<br>MCG SPLIT SRB<br>SCG SRB | MCG BEARER<br>MCG SPLIT BEARER<br>SCG BEARER<br>SCG SPLIT BEARER |

Fig. 5

RADIO ACCESS NETWORK NODE, RADIO TERMINAL, AND METHODS THEREFOR

CROSS REFERENCE TO RELATED APPLICATIONS

This application is a National Stage of International Application No. PCT/JP2018/002041, filed Jan. 24, 2018, claiming priority to Japanese Patent Application No. 2017-118095, filed Jun. 15, 2017, the contents of all of which are incorporated herein by reference in their entirety.

TECHNICAL FIELD

The present disclosure relates to a radio communication system and, in particular, to communication in which a radio terminal simultaneously uses a plurality of cells of different Radio Access Technologies (RATs) operated by different radio stations (multi-connectivity operation).

BACKGROUND ART

The 3rd Generation Partnership Project (3GPP) has been conducting the standardization for the fifth generation mobile communication system (5G) to make it a commercial reality in 2020 or later. 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a 5G-RAN or a NextGen RAN (NG RAN). A new base station in the 5G-RAN is referred to as a NR NodeB (NR NB) or a gNodeB (gNB). A new core network for the 5G System is referred to as a 5G Core Network (5G-CN or 5GC) or a NextGen Core (NG Core). A radio terminal (i.e., User Equipment (UE)) capable of being connected to the 5G System is referred to as 5G UE or NextGen UE (NG UE), or simply referred to as UE. The official names of the RAT, UE, radio access network, core network, network entities (nodes), protocol layers and the like for the 5G System will be determined in the future as standardization work progresses.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN (E-UTRAN)) and a core network (i.e., EPC). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS. An SDF is one or more packet flows that match an SDF template (i.e., packet filters) based on a Policy and Charging Control (PCC) rule. In order to achieve packet routing, each packet to be transferred through an EPS bearer contains information for identifying which bearer (i.e., General Packet Radio Service (GPRS) Tunneling Protocol (GTP) tunnel) the packet is associated with.

In contrast, with regard to the 5G System, it is discussed that although radio bearers may be used in the NG-RAN, no bearers are used in the 5GC or in the interface between the 5GC and the NG-RAN (see Non-Patent Literature 1). Specifically, PDU flows are defined instead of an EPS bearer, and one or more SDFs are mapped to one or more PDU flows. A PDU flow between a 5G UE and a user-plane terminating entity in an NG Core (i.e., an entity corresponding to a P-GW in the EPC) corresponds to an EPS bearer in the EPS Bearer-based QoS concept. The PDU flow corresponds to the finest granularity of the packet forwarding and treatment in the 5G system. That is, the 5G System adopts the Flow-based QoS (or per-flow QoS) concept instead of the Bearer-based QoS concept. In the Flow-based QoS concept, QoS is handled per PDU flow. In the QoS framework of the 5G system, a PDU flow is identified by a PDU flow ID contained in a header encapsulating a Service Data Unit of a tunnel of a NG3 interface. The NG3 interface is a user plane interface between the 5GC and the gNB (i.e., NG-RAN). Association between a 5G UE and a data network is referred to as a "PDU session". The term "PDU session" corresponds to the term "PDN connection" in LTE and LTE-Advanced. A plurality of PDU flows can be configured in one PDU session.

The PDU flow is also referred to as a "QoS flow". The QoS flow is the finest granularity in QoS treatment in the 5G system. User plane traffic having the same NG3 marking value in a PDU session corresponds to a QoS flow. The NG3 marking corresponds to the above-described PDU flow ID, and it is also referred to as a QoS flow ID or a Flow Identification Indicator (FII).

FIG. 1 shows a basic architecture of the 5G system. A UE establishes one or more Signalling Radio Bearers (SRBs) and one or more Data Radio Bearers (DRBs) with a gNB. The 5GC and the gNB establish a control plane interface and a user plane interface for the UE. The control plane interface between the 5GC and the gNB (i.e., RAN) is referred to as an NG2 interface or an NG-c interface and is used for transfer of Non-Access Stratum (NAS) information and for transfer of control information (e.g., NG2 AP Information Element) between the 5GC and the gNB. The user plane interface between the 5GC and the gNB (i.e., RAN) is referred to as an NG3 interface or an NG-u interface and is used for transfer of packets of one or more PDU flows in a PDU session of the UE.

Note that the architecture shown in FIG. 1 is merely one of the 5G architecture options (or deployment scenarios).

The architecture shown in FIG. 1 is referred to as "Standalone NR (in NextGen System)" or "Option 2". The 3GPP further discusses several network architectures for multi-connectivity operations using the E-UTRA and NR radio access technologies. The multi-connectivity operation using the E-UTRA and NR radio access technologies is referred to as Multi-RAT Dual Connectivity (MR-DC). The MR-DC is dual connectivity between E-UTRA and NR nodes.

In the MR-DC, one of the E-UTRA node (i.e., eNB) and the NR node (i.e., gNB) operates as a Master node (MN) and the other one operates as a Secondary node (SN), and at least the MN is connected to the core network. The MN provides one or more Master Cell Group (MCG) cells to the UE, while the SN provides one or more Secondary Cell Group (SCG) cells to the UE. The MR-DC includes "MRDC with the EPC" and "MRDC with the 5GC".

The MRDC with the EPC includes E-UTRA-NR Dual Connectivity (EN-DC). In the EN-DC, the UE is connected to an eNB operating as the MN and a gNB operating as the SN. Further, the eNB (i.e., Master eNB) is connected to the EPC, while the gNB (i.e. Secondary gNB) is connected to the Master eNB through the X2 interface.

The MRDC with the 5GC includes NR-E-UTRA Dual Connectivity (NE-DC) and E-UTRA-NR Dual Connectivity (NG-EN-DC). In the NE-DC, the UE is connected to a gNB operating as the MN and an eNB operating as the SN, the gNB (i.e., Master gNB) is connected to the 5GC, and the eNB (i.e. Secondary eNB) is connected to the Master gNB through the Xn interface. On the other hand, in the NG-EN-DC, the UE is connected to an eNB operating as the MN and a gNB operating as the SN, the eNB (i.e., Master eNB) is connected to the 5GC, and the gNB (i.e. Secondary gNB) is connected to the Master eNB through the Xn interface.

FIGS. 2, 3, and 4 show network configurations of the above-described three DC types, i.e., EN-DC, NE-DC, and NG-EN-DC, respectively. FIG. 5 shows SRBs and DRBs supported by these three DC types. Not that, FIG. 5 shows bearer types to be supported in 3GPP Release 15 that is currently under discussion in the 3GPP. Accordingly, the bearer types supported by the three DC types may be different from those shown in FIG. 5.

The MCG SRB is an SRB established between the UE and the MN. Radio Resource Control Protocol Data Units (RRC PDUs) generated by the SN can be transported to the UE via the MN and the MCG SRB. Alternatively, the UE is able to establish an SRB (SCG SRB) with the SN in order to transport RRC PDUs for the SN directly between the UE and the SN. The MCG split SRB enables duplication of RRC PDUs generated by the MN.

The MCG bearer is a user plane bearer whose radio protocols are only located in the MCG. The MCG split bearer is a user plane bearer whose radio protocols are split at the MN and belong to both the MCG and the SCG. The SCG bearer is a user plane bearer whose radio protocols are only located in the SCG. The SCG split bearer is a user plane bearer whose radio protocols are split at the SN and belong to both the SCG and the MCG.

Note that, the layer 2 functionality of the gNB (NR) is not the same as the layer 2 functionality of the eNB (LTE). For example, the layer 2 of the gNB (NR) includes four sublayers, i.e., a Service Data Adaptation Protocol (SDAP) sublayer, a Packet Data Convergence Protocol (PDCP) sublayer, a Radio Link Control (RLC) sublayer, and a Medium Access Control (MAC) sublayer. In the NR PDCP sublayer, the size of the PDCP Sequence Number (SN) for DRBs is 12 bits or 18 bits, which is a subset of the possible values for the size of LTE PDCP SN (i.e., 7 bits, 12 bits, 15 bits, or 18 bits). However, when the eNB (LTE) is connected to the 5GC, the layer 2 of the eNB (LTE) includes an SDAP sublayer.

The 3GPP is also discussing an introduction of a unified split bearer. The purpose of the introduction of the unified split bearer is to use the same protocols, configurations, and procedures for both the MCG and SCG split bearers as much as possible, thereby simplifying the specification and UE implementation. As specific means for this introduction, a common (single) PDCP layer has been proposed (see Non-Patent Literature 1). The common PDCP layer supports both the MCG and SCG split bearers. For example, the common PDCP layer may be the same as a PDCP layer (NR PDCP layer) used for the NR standalone operation.

Non-Patent Literature 1 proposes that it should be possible to switch between split and no-split bearers without re-establishing PDCP in cases where the PDCP termination point is not moved. Non-Patent Literature 1 further proposes that it should be possible to configure the same PDCP version as used for split bearers already when the UE operates in LTE only, to allow switching to and from split bearers without PDCP re-establishment due to protocol change.

CITATION LIST

Non Patent Literature

[Non-Patent Literature 1] 3GPP Tdoc R2-1704414, Ericsson, "On the different bearer options", 3GPP TSG-RAN WG2 Meeting #98, May 2017

SUMMARY OF INVENTION

Technical Problem

As described above, Non-Patent Literature 1 proposes a common (single) PDCP layer that supports both the MCG and SCG split bearers. The common PDCP layer may be referred to as a unified PDCP layer. However, it is not clear how the common (or unified) PDCP layer should be implemented in a radio communication network (e.g., 3GPP network).

One of the objects to be attained by embodiments disclosed herein is to provide an apparatus, a method, and a program that assist in implementation of a common (or unified) PDCP layer in a radio communication network. It should be noted that this object is merely one of the objects to be attained by the embodiments disclosed herein. Other objects or problems and novel features will be made apparent from the following description and the accompanying drawings.

Solution to Problem

In a first aspect, a master RAN node associated with a master RAT includes a memory and at least one processor coupled to the memory. The at least one processor is configured to communicate with a secondary RAN node associated with a secondary RAT and provide a radio terminal with dual connectivity that uses the master RAT and the secondary RAT. The at least one processor is further configured to, in response to receiving, from the radio terminal or a core network, terminal capability information indicating that the radio terminal supports a split bearer, use a Packet Data Convergence Protocol (PDCP) entity, which provides unified PDCP functionalities, for a master cell group split bearer for the radio terminal. The unified PDCP functionalities are used for both the master cell group split bearer and a secondary cell group split bearer. The master cell group split bearer is a user plane bearer whose radio protocols are split at the master RAN node and belong to both a master cell group provided by the master RAN node and a secondary cell group provided by the secondary RAN node. The secondary cell group split bearer is a user plane bearer whose radio protocols are split at the secondary RAN node and belong to both the secondary cell group and the master cell group.

In a second aspect, a secondary RAN node configured to support a secondary RAT includes a memory and at least one processor coupled to the memory. The at least one processor is configured to communicate with a master RAN node that supports a master RAT and provide a radio terminal with dual connectivity that uses the master RAT and the secondary RAT. The at least one processor is further configured to, if the master RAN node receives, from the radio terminal or a core network, terminal capability information indicating that the radio terminal supports a split bearer, use a Packet Data Convergence Protocol (PDCP) entity, which provides unified PDCP functionalities, for a secondary cell group split bearer for the radio terminal.

In a third aspect, a radio terminal includes at least one wireless transceiver and at least one processor. The at least one wireless transceiver is configured to communicate with both a master radio access network (RAN) node associated with a master radio access technology (RAT) and a secondary RAN node associated with a secondary RAT. The at least one processor is configured to perform, via the at least one wireless transceiver, dual connectivity that uses the master RAT and the secondary RAT. The at least one processor is further configured to, if the radio terminal supports a split bearer, transmit, to the master RAN node, terminal capability information indicating that the radio terminal supports a split bearer. Furthermore, the at least one processor is configured to, if the radio terminal supports a split bearer, use a Packet Data Convergence Protocol (PDCP) entity, which provides unified PDCP functionalities, for a master cell group split bearer for the radio terminal.

In a fourth aspect, a method for a master RAN node associated with a master RAT includes:

(a) communicating with a secondary RAN node associated with a secondary RAT and providing a radio terminal with dual connectivity that uses the master RAT and the secondary RAT; and (b) in response to receiving, from the radio terminal or a core network, terminal capability information indicating that the radio terminal supports a split bearer, using a Packet Data Convergence Protocol (PDCP) entity for a master cell group split bearer for the radio terminal, the PDCP entity providing unified PDCP functionalities.

In a fifth aspect, a method for a secondary RAN node configured to support a secondary RAT includes:

(a) communicating with a master RAN node that supports a master RAT and providing a radio terminal with dual connectivity that uses the master RAT and the secondary RAT; and (b) if the master RAN node receives, from the radio terminal or a core network, terminal capability information indicating that the radio terminal supports a split bearer, using a Packet Data Convergence Protocol (PDCP) entity for a secondary cell group split bearer for the radio terminal, the PDCP entity providing unified PDCP functionalities.

In a sixth aspect, a method for a radio terminal includes:

(a) performing dual connectivity that uses a master radio access technology (RAT) and a secondary RAT via a wireless transceiver configured to communicate with both a master radio access network (RAN) node associated with the master RAT and a secondary RAN node associated with the secondary RAT;

(b) if the radio terminal supports a split bearer, transmitting, to the master RAN node, terminal capability information indicating that the radio terminal supports a split bearer; and (c) if the radio terminal supports a split bearer, using a Packet Data Convergence Protocol (PDCP) entity for a master cell group split bearer for the radio terminal, the PDCP entity providing unified PDCP functionalities.

In a seventh aspect, a master RAN node associated with a master RAT includes a memory and at least one processor coupled to the memory. The at least one processor is configured to communicate with a secondary RAN node associated with a secondary RAT and provide a radio terminal with dual connectivity that uses the master RAT and the secondary RAT. The at least one processor is further configured to, if the radio terminal does not support a split bearer, use, for a master cell group bearer for the radio terminal, a PDCP entity that provides first Packet Data Convergence Protocol (PDCP) functionalities corresponding to the master RAT. Furthermore, the at least one processor is configured to, if the radio terminal supports the split bearer, use, for the master cell group bearer for the radio terminal, a PDCP entity that provides unified PDCP functionalities, regardless of whether the dual connectivity is started for the radio terminal. The master cell group bearer is a user plane bearer whose radio protocols are only located in the master cell group.

In an eighth aspect, a radio terminal includes at least one wireless transceiver and at least one processor. The at least one wireless transceiver is configured to communicate with both a master radio access network (RAN) node associated with a master radio access technology (RAT) and a secondary RAN node associated with a secondary RAT. The at least one processor is configured to perform, via the at least one wireless transceiver, dual connectivity that uses the master RAT and the secondary RAT. The at least one processor is further configured to, if the radio terminal does not support a split bearer, use, for a master cell group bearer for the radio terminal, a PDCP entity that provides first Packet Data Convergence Protocol (PDCP) functionalities corresponding to the master RAT. Furthermore, the at least one processor is configured to use, if the radio terminal supports the split bearer, use, for the master cell group bearer for the radio terminal, a PDCP entity that provides unified PDCP functionalities, regardless of whether the dual connectivity is started for the radio terminal.

In a ninth aspect, a method for a master RAN node associated with a master RAT includes:

(a) communicating with a secondary RAN node associated with a secondary RAT and providing a radio terminal with dual connectivity that uses the master RAT and the secondary RAT;

(b) if the radio terminal does not support a split bearer, using, for a master cell group bearer for the radio terminal, a PDCP entity that provides first Packet Data Convergence Protocol (PDCP) functionalities corresponding to the master RAT; and (c) if the radio terminal supports the split bearer, using, for the master cell group bearer for the radio terminal, a PDCP entity that provides unified PDCP functionalities, regardless of whether the dual connectivity is started for the radio terminal.

In a tenth aspect, a method for a radio terminal comprises:

(a) performing dual connectivity that uses a master radio access technology (RAT) and a secondary RAT via a wireless transceiver configured to communicate with both a master radio access network (RAN) node associated with the master RAT and a secondary RAN node associated with the secondary RAT;

(b) if the radio terminal does not support a split bearer, using, for a master cell group bearer for the radio terminal, a PDCP entity that provides first Packet Data Convergence Protocol (PDCP) functionalities corresponding to the master RAT; and (c) if the radio terminal supports the split bearer, using, for the master cell group bearer for the radio terminal, a PDCP entity that provides unified PDCP functionalities, regardless of whether the dual connectivity is started for the radio terminal.

In an eleventh aspect, a program includes instructions (software codes) that, when loaded into a computer, cause the computer to perform the method according to the above-described fourth, fifth, sixth, ninth, or tenth aspect.

Advantageous Effects of Invention

According to the above-deceived aspects, it is possible to provide an apparatus, a method, and a program that assist in implementation of a common (or unified) PDCP layer in a radio communication network.

BRIEF DESCRIPTION OF DRAWINGS

FIG. 5 is a table indicating bearer types supported by the three DC types currently under discussion in the 3GPP;

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on 3GPP Multi-RAT Dual Connectivity (MR-DC) using E-UTRA and NR. However, these embodiments may be applied to other radio communication systems supporting DC architecture using other different RATs.

First Embodiment

Figure 1:
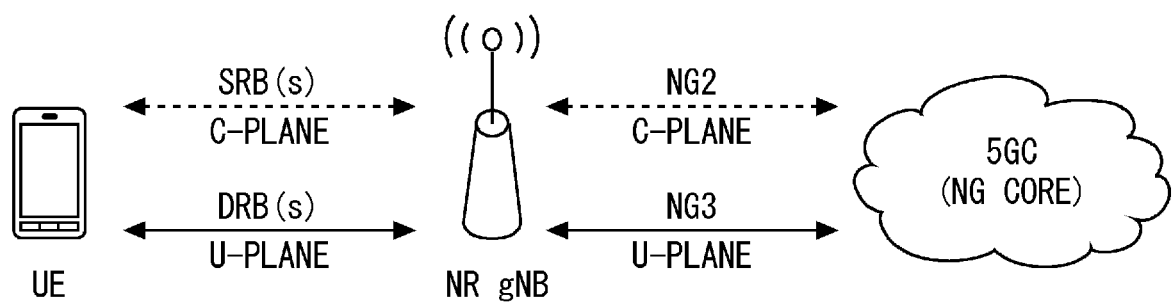
FIG. 1 is a diagram showing a basic architecture of a 5G System.
Figure 2:
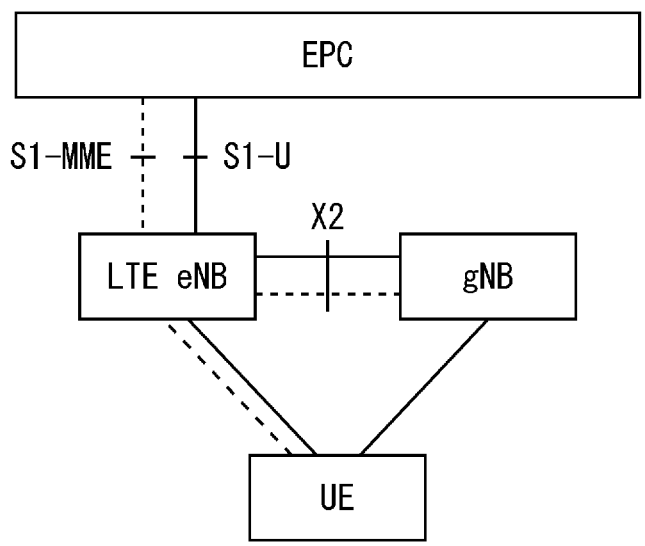
FIG. 2 is a diagram showing a network configuration of EN-DC.
Figure 3:
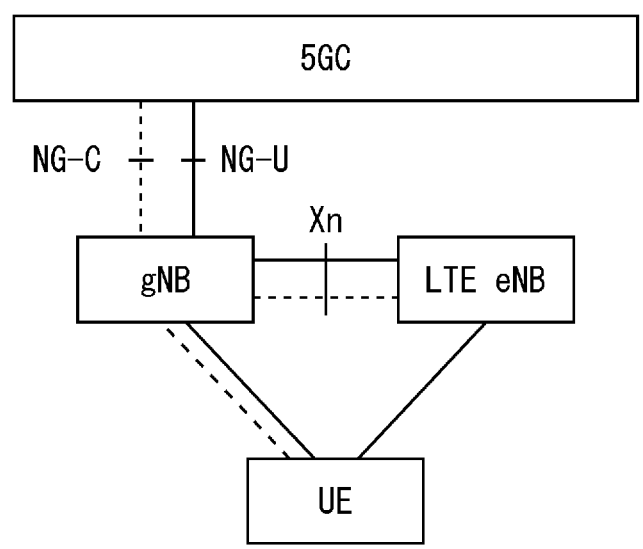
FIG. 3 is a diagram showing a network configuration of NE-DC.
Figure 4:
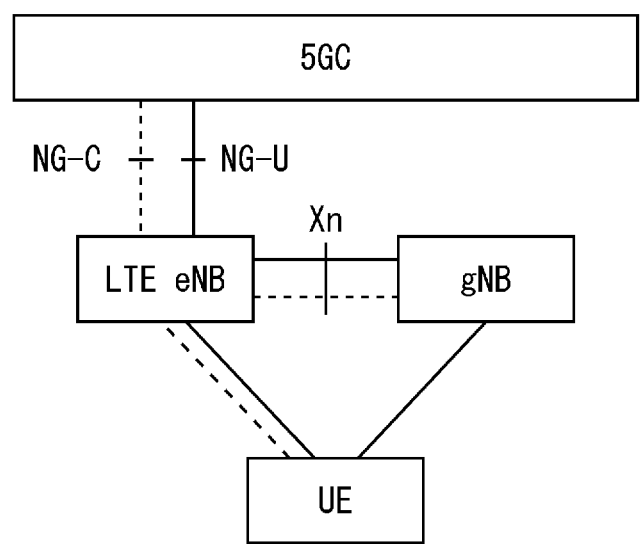
FIG. 4 is a diagram showing a network configuration of NG-EN-DC.
Figure 6:
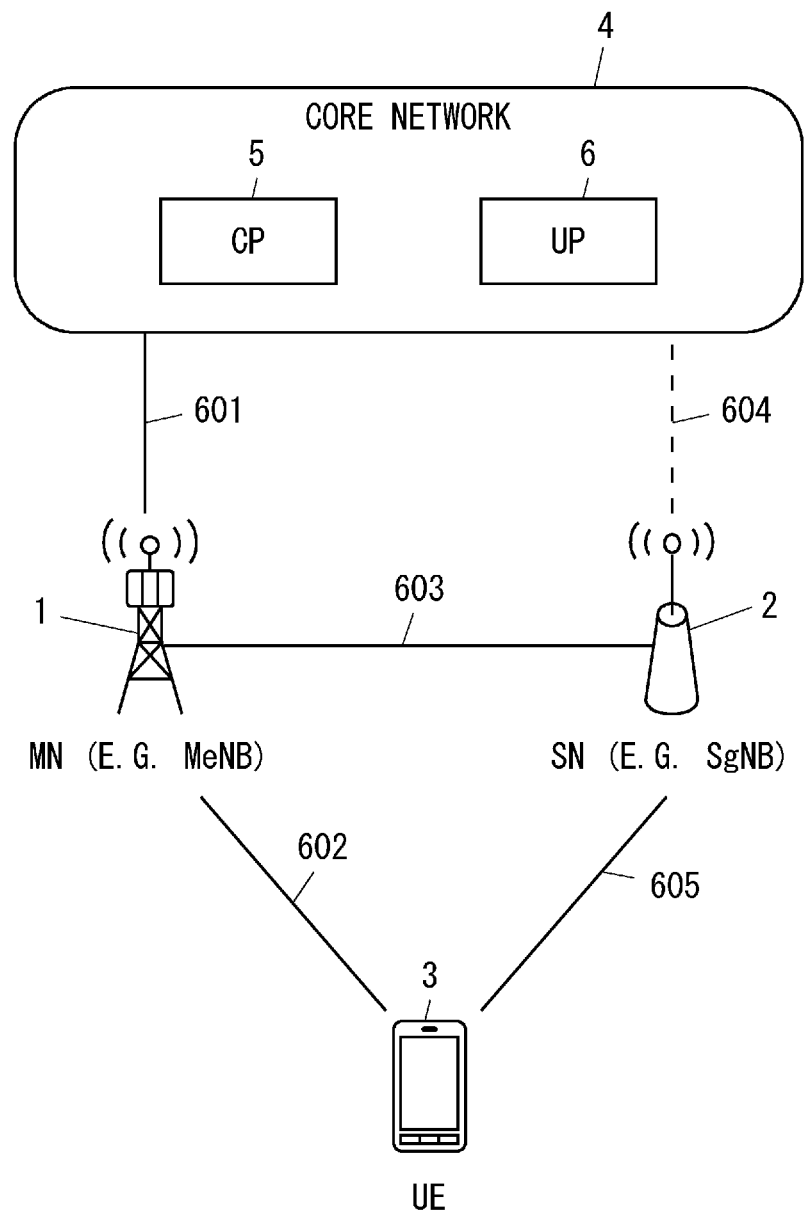
FIG. 6 is a diagram showing a configuration example of a radio communication network according to a plurality of embodiments.

FIG. 6 shows a configuration example of a radio communication network according to a plurality of embodiments including this embodiment. In the example shown in FIG. 6, the radio communication network includes a master node (MN) 1, a secondary node (SN) 2, a UE 3, and a core network 4. The radio communication network shown in FIG. 6 supports Multi-RAT Dual Connectivity (MR-DC). More specifically, one of the MN 1 and the SN 2 is an E-UTRA node (i.e., eNB) and the other one is an NR node (i.e., gNB). At least the MN 1 is connected to the core network 4 via an interface 601. The SN 2 may also be connected to the core network 4 via an interface 604. The core network 4 is an EPC in the case of the MRDC with the EPC, whereas it is a 5GC in the case of the MRDC with the 5GC. The interfaces 601 and 604 are S1 interfaces (i.e., S1-MME and S1-U) in the case of MRDC with the EPC, whereas they are NG interfaces (i.e., NG-c and NG-u, or NG2 and NG3) in the case of the MRDC with the 5GC. The MN 1 and the SN 2 are connected to each other via an interface 603. The interface 603 is an X2 interface in the case of the MRDC with the EPC, whereas it is an Xn interface in the case of the MRDC with the 5GC.

The core network 4 includes one or more control plane (CP) nodes 5 and one or more user plane (UP) nodes 6. The CP node 5 may also be referred to as Control Plane Network Functions (CP NFs). The UP node 6 may be referred to as User Plane Network Functions (UP NFs). In the case of the MRDC with the EPC, for example, one or more CP nodes 5 include an MME and a Policy and Charging Rules Function (PCRF), while one or more UP nodes 6 include an S-GW and a P-GW. In the case of the MRDC with the 5GC, for example, one or more CP nodes 5 include an Access and Mobility Management Function (AMF), a Session Management Function (SMF), and a Policy Control function (PCF), while one or more UP nodes 6 include a User plane Function (UPF).

The UE 3 supports Multi-RAT Dual Connectivity (MR-DC). Specifically, the UE 3 supports a multi-connectivity operation that uses the E-UTRA and NR radio access technologies. In the following description, the RAT supported by the MN 1 is referred to as a master RAT, while the RAT supported by the SN 2 is referred to as a secondary RAT. In other words, the MN 1 and the SN 2 are associated with the master RAT and the secondary RAT, respectively. In the case of the EN-DC and the NG-EN-DC, the MN 1 is a Master eNB, the SN 2 is a Secondary gNB, the master RAT is E-UTRA, and the secondary RAT is NR (5G RAT). On the other hand, in the case of the NE-DC, the MN 1 is a Master gNB, the SN 2 is a Secondary eNB, the master RAT is NR (5G RAT), and the secondary RAT is E-UTRA. The UE 3 has a capability to communicate simultaneously with the MN 1 associated with the master RAT and the SN 2 associated with the secondary RAT. In other words, the UE 3 has a capability to aggregate a cell(s) belonging to the Master Cell Group (MCG) provided by the MN 1 with a cell(s) belonging to the Secondary Cell Group (SCG) provided by the SN 2. The MCG includes one or more cells provided from the master RAT. The SCG includes one or more cells provided from the secondary RAT. An air interface 602 between the MN 1 and the UE 3 provides a control plane connection (e.g., RRC connection) and a user plane connection (e.g., user plane bearer). On the other hand, an air interface 605 between the gNB 2 and the UE 3 includes at least a user plane connection, but it does not need to include a control plane connection.

Figure 7:
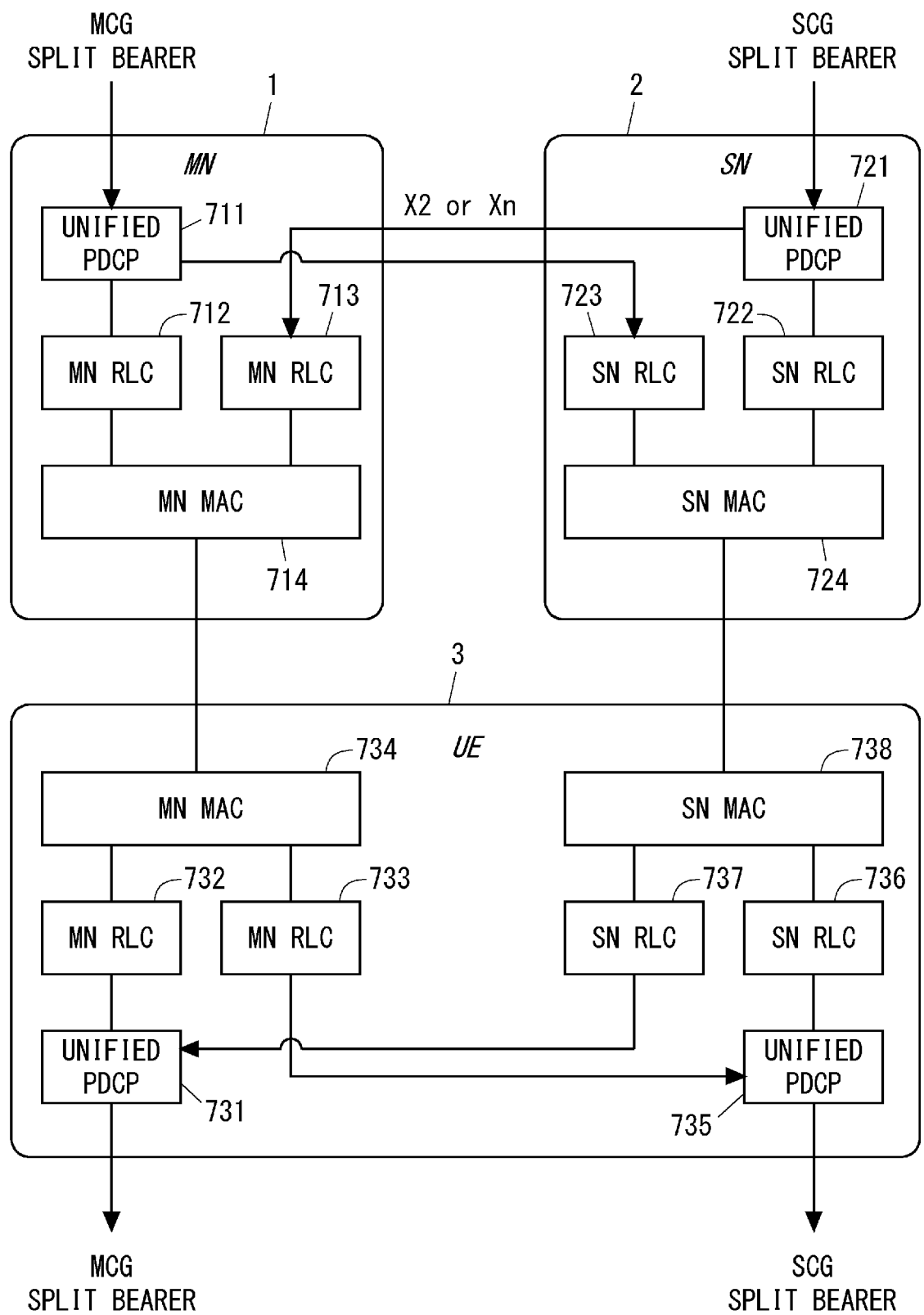
FIG. 7 is a diagram showing radio protocol architecture for a split bearer according to a plurality of embodiments.

FIG. 7 shows radio protocol architecture for MCG and SCG split bearers according to this embodiment. As already described above, the MCG split bearer is a user plane bearer whose radio protocols are split at the MN 1 and belong to both the MCG and the SCG. The SCG split bearer is a user plane bearer whose radio protocols are split at the SN 2 and belong to both the SCG and the MCG. Although the EN-DC is assumed in this example, the radio protocol architecture for split bearers in the NE-DC and the NG-EN-DC is basically similar to that shown in FIG. 7, except that there is an SDAP layer that is an upper layer of the unified PDCP layer.

As shown in FIG. 7, in this embodiment, the unified PDCP layer is used. The unified PDCP layer may also be referred to as a single or common PDCP layer. The unified PDCP layer can be used for both the MCG and SCG split bearers. The unified PDCP entities 711 and 721, which are located respectively in the transmitting sides of the MN 1 and the SN 2 as shown in FIG. 7, are PDCP entities in the unified PDCP layer and provide unified PDCP functionalities corresponding to the unified PDCP layer. The unified PDCP functionalities are used for both the MCG and SCG split bearers. The unified PDCP functionalities or the unified PDCP entities 711 and 721 may be implemented in various ways, for example, as shown below.

In some implementations, the unified PDCP functionalities may be common functionalities that both the MN PDCP functionalities (e.g., LTE PDCP functionalities) that correspond to the master RAT (e.g., E-UTRA) and the SN PDCP functionalities (e.g., NR PDCP functionalities) that correspond to the secondary RAT (e.g., NR) have. In other words, the unified PDCP functionalities may be a common subset between the MN PDCP functionalities (e.g., LTE PDCP functionalities) and the SN PDCP functionalities (e.g., NR PDCP functionalities).

In some implementations, the unified PDCP functionalities may be implemented by executing the MN PDCP functionalities (e.g., NR PDCP functionalities), which correspond to the master RAT (e.g., NR), as one of the modes (or sub-modes) of the SN PDCP functionalities (e.g., LTE PDCP functionalities), which correspond to the secondary RAT (e.g., LTE).

In some implementations, the unified PDCP functionalities may be implemented by executing the SN PDCP functionalities (e.g., NR PDCP functionalities), which correspond to the secondary RAT (e.g., NR), as one of the modes (or sub-modes) of the MN PDCP functionalities (e.g., LTE PDCP functionalities), which correspond to the master RAT (e.g., LTE).

In some implementations, the SN PDCP functionalities (e.g., NR PDCP functionalities) may be a subset of the MN PDCP functionalities (e.g., LTE PDCP functionalities). In this case, the unified PDCP functionalities may be the same as, or a subset of, the SN PDCP functionalities.

In some implementations, the MN PDCP functionalities (e.g., LTE PDCP functionalities) may be a subset of the SN PDCP functionalities (e.g., NR PDCP functionalities). In this case, the unified PDCP functionalities may be the same as, or a subset of, the MN PDCP functionalities.

In some implementations, the unified PDCP entities 711 and 721 may be implemented in a manner such that the MN PDCP entity (e.g., LTE PDCP entity) of the MN 1 has a configuration that is, at least in part, common to (or the same as) that for the SN PDCP entity (e.g., NR PDCP entity) of the SN 2.

In some implementations, the unified PDCP entities 711 and 721 may be implemented in a manner such that the SN PDCP entity (e.g., LTE PDCP entity) of the SN 2 has a configuration that is, at least in part, common to (or the same as) that for the MN PDCP entity (e.g., NR PDCP entity) of the MN 1.

In some implementations, the unified PDCP layer may be implemented in a manner such that the MN PDCP layer (e.g., LTE PDCP layer) performs the functionalities of the SN PDCP layer (e.g., NR PDCP layer).

In some implementations, the unified PDCP layer may be implemented in a manner such that the SN PDCP layer (e.g., LTE PDCP layer) performs the functionalities of the MN PDCP layer (e.g., NR PDCP layer).

In some implementations, in order to provide the unified PDCP functionalities, an SN PDCP (e.g., NR PDCP) layer module operating as an upper (or sub) layer of the MN PDCP (e.g., LTE PDCP) layer may be located in the MN 1.

In some implementations, in order to provide the unified PDCP functionalities, an MN PDCP (e.g., NR PDCP) layer module operating as an upper (or sub) layer of the SN PDCP (e.g., LTE PDCP) layer may be located in the SN 2.

In some implementations, each of the MeNB 1, the SgNB 2, and the UE 3 may prepare a PDCP entity that provides unified PDCP functionalities by establishing, re-establishing, or reconfiguring a PDCP entity with a configuration common to both the MN PDCP functionalities and the SN PDCP functionalities, or by switching the mode (or sub-mode) of the PDCP entity.

An MN RLC entity 712, which is an RLC entity located in the MN 1 for the MCG split bearer, receives PDCP PDUs from the unified PDCP entity 711 located in the MN 1 and provides RLC PDUs to an MN MAC entity 714. On the other hand, an MN RLC entity 713, which is an RLC entity located in the MN 1 for the SCG split bearer, receives PDCP PDUs from the unified PDCP entity 721 located in the SN 2 and provides RLC PDUs to the MN MAC entity 714. The MN MAC entity 714 is a MAC entity located in the MN 1 for the UE 3. The MN RLC entities 712 and 713 and the MN MAC entity 714 provide RLC functions and MAC functions conforming to the master RAT (e.g., E-UTRA).

An SN RLC entity 722, which is an RLC entity located in the SN 2 for the SCG split bearer, receives PDCP PDUs from the unified PDCP entity 721 located in the SN 2 and provides RLC PDUs to an SN MAC entity 724. On the other hand, the SN RLC entity 723, which is an RLC entity located in the SN 2 for the MCG split bearer, receives PDCP PDUs from the unified PDCP entity 711 located in the MN 1 and provides RLC PDUs to the SN MAC entity 724. The SN MAC entity 724 is a MAC entity located in the SN 2 for the UE 3. The SN RLC entities 722 and 723 and the SN MAC entity 724 provide RLC functions and MAC functions conforming to the secondary RAT (e.g., NR).

Unified PDCP entities 731 and 735, which are located in the receiving side of the UE 3 as shown in FIG. 7, are PDCP entities in the unified PDCP layer and provide unified PDCP functionalities corresponding to the unified PDCP layer. The unified PDCP entities 731 and 735 may be implemented in a way similar to that for the above-described unified PDCP entities 711 and 721. The method of implementing the unified PDCP entities 731 and 735 in the UE 3 may be different from the method of implementing the unified PDCP entities 711 and 721 in the MN 1 and the SN 2.

An MN MAC entity 734 is a MAC entity located in the UE 3 for communicating with the MN 1 via an MCG cell. The MN MAC entity 734 receives MAC PDUs from a lower layer (i.e., physical layer) (not shown) and provides MAC SDUs (RLC PDUs) to MN RLC entities 732 and 733. The MN RLC entity 732, which is an RLC entity located in the UE 3 for the MCG split bearer, provides RLC SDUs (PDCP PDUs) to the unified PDCP entity 731. On the other hand, the MN RLC entity 733, which is an RLC entity located in the UE 3 for the SCG split bearer, provides RLC SDUs (PDCP PDUs) to the unified PDCP entity 735. The MN RLC entities 732 and 733 and the MN MAC entity 734 provide RLC functions and MAC functions conforming to the master RAT (e.g., E-UTRA).

An SN MAC entity 738 is a MAC entity located in the UE 3 for communicating with the SN 2 via an SCG cell. The SN MAC entity 738 receives MAC PDUs from a lower layer (i.e., physical layer) (not shown) and provides MAC SDUs (RLC PDUs) to SN RLC entities 736 and 737. The SN RLC entity 736, which is an RLC entity located in the UE 3 for the SCG split bearer, provides RLC SDUs (PDCP PDUs) to the unified PDCP entity 735. On the other hand, the SN RLC entity 737, which is an RLC entity located in the UE 3 for the MCG split bearer, provides RLC SDUs (PDCP PDUs) to the unified PDCP entity 731. The SN RLC entities 736 and 737 and the SN MAC entity 738 provide RLC functions and MAC functions conforming to the secondary RAT (e.g., NR).

In the following, operations of the MN 1, the SN 2, and the UE 3 according to this embodiment will be described. The MN 1 is configured to communicate with the SN 2 associated with the secondary RAT and provide the UE 3 with dual connectivity that uses the master RAT and the secondary RAT. The MN 1 is further configured to, in response to receiving, from the UE 3 or the core network 4, UE capability information indicating that the UE 3 supports split bearers, configure (or establish) the PDCP entity 711 providing the unified PDCP functionalities and use this PDCP entity 711 for an MCG split bearer for the UE 3. In addition, in order to configure the PDCP entity 731 in the UE 3 to provide the unified PDCP functionalities, the MN 1 transmits unified PDCP configuration information (e.g., unified PDCP-config) regarding the MCG split bearer to the UE 3. The UE 3 receives the unified PDCP configuration information regarding the MCG split bearer and configures (or establishes) the unified PDCP entity 731 for the MCG split bearer in accordance with this information. Accordingly, the UE 3 uses the unified PDCP entity 731, which provides the unified PDCP functionalities, for the MCG split bearer for the UE 3.

The SN 2 is configured to communicate the MN 1 associated with the master RAT and provide the UE 3 with dual connectivity that uses the master RAT and the secondary RAT. The SN 2 is further configured to, if the MN 1 has received from the UE 3 or the core network 4 the UE capability information indicating that the UE 3 supports split bearers, configure (or establish) the PDCP entity 721 providing the unified PDCP functionalities and use this PDCP entity 721 for an SCG split bearer for the UE 3. In addition, in order to configure the PDCP entity 735 in the UE 3 to provide the unified PDCP functionalities, the SN 2 transmits unified PDCP configuration information (e.g., unified PDCP-config) regarding the SCG split bearer to the UE 3. This PDCP configuration information may be sent to the UE 3 via the MN 1, or may be sent directly from the SN 2 to the UE 3 if an RRC connection between the SN 2 and the UE 3 is available. The UE 3 receives the unified PDCP configuration information regarding the SCG split bearer and configures (or establishes) the unified PDCP entity 735 for the SCG split bearer in accordance with this information. Accordingly, the UE 3 uses the unified PDCP entity 735, which provides the unified PDCP functionalities, for the SCG split bearer for the UE 3.

In the above example, it is assumed that the UE capability is specified on the premise that the UE 3 supporting the unified PDCP functionalities always supports both MCG and SCG split bearers. In other words, it is assumed that one UE capability regarding the support of split bearers indicates support of both MCG and SCG split bearers, and that the UE 3 t supporting split bearers supports the unified PDCP functionalities. Alternatively, separate UE capabilities may be specified respectively for MCG split bearers and SCG split bearers. In other words, discrete UE capabilities may be specified respectively for MCG and SCG split bearers, and the UE 3 that supports at least one of the two types of split bearers may support the unified PDCP functionalities.

Further, the UE capability information may explicitly or implicitly indicate that the UE 3 supports split bearers in the MR-DC. The UE capability information may be, for example, information (e.g., unified bearer support) indicating whether the UE 3 supports unified bearers. Alternatively, the UE capability information may be information (e.g., unified PDCP support) indicating whether the UE 3 supports unified PDCP. Alternatively, the UE capability information may be information (e.g., EN-DC support, NG-EN-DC support, NE-DC support) indicating whether the UE 3 supports MR-DC (i.e., EN-DC, NG-EN-DC, NE-DC, or any combination thereof).

Figure 8:
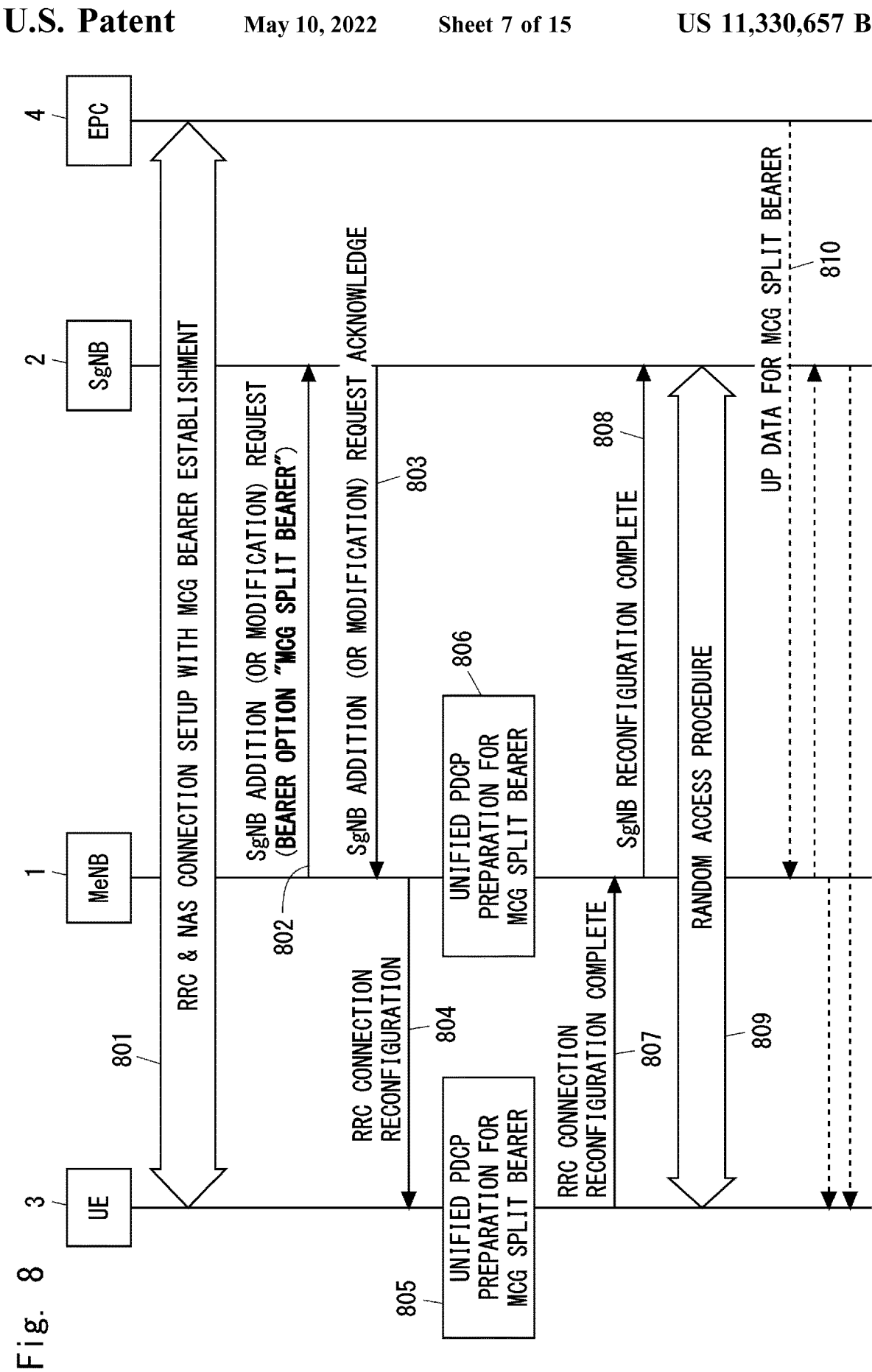
FIG. 8 is a sequence diagram showing one example of a procedure for establishing an MCG split bearer according to a first embodiment.

FIG. 8 is a sequence diagram showing one example of a procedure for establishing an MCG split bearer according to this embodiment. FIG. 8 shows an example of the EN-DC. Specifically, in FIG. 8, the MN 1 is a Master eNB (MeNB), the SN 2 is a Secondary gNB (SgNB), and the core network 4 is an EPC. In Step 801, the UE 3 establishes an RRC connection with the MeNB 1, establishes a Non-Access Stratum (NAS) connection with the EPC 4 (e.g., an MME serving as the CP node 5) via the MeNB 1, and establishes an MCG bearer in an MCG cell provided by the MeNB 1.

Further, in Step 801, the MeNB 1 receives UE capability information from the UE 3 or the EPC 4 (e.g., an MME serving as the CP node 5). This UE capability information explicitly or implicitly indicates that the UE 3 supports split bearers.

In Step 802, in order to configure an MCG split bearer for the UE 3, the MeNB 1 sends an SgNB Addition (or Modification) Request message to the SgNB 2 via the interface 603 (i.e., X2 interface). This SgNB Addition (or Modification) Request message contains a Bearer Option Information Element (IE) set to the value "MCG split bearer". This SgNB Addition (or Modification) Request message also contains an RRC container containing an SCG-ConfigInfo message. This SCG-ConfigInfo message includes configurations for the MCG split bearer and also includes a drb-type information element (IE) set to the value "MCG split".

In Step 803, the SgNB 2 sends an SgNB Addition (or Modification) Request Acknowledge message to the MeNB 1 via the interface 603 (i.e., X2 interface). This message contains an RRC container containing an SCG-Config message. This SCG-Config message includes SCG configurations for the MCG split bearer and also includes a drb-type information element (IE) set to the value "MCG split".

In Step 804, the MeNB 1 transmits an RRC Connection Reconfiguration message to the UE 3. This message contains unified PDCP configuration information (e.g., unified PDCP-config) regarding the MCG split bearer. This unified PDCP configuration information causes the UE 3 to establish, re-establish, or configure a unified PDCP entity for the MCG split bearer. This message also contains SCG configurations including the SCG-Config information element (IE) and including other information for the NR SCG. The change of the bearer type from the MCG bearer to the MCG split bearer may be implicitly indicated by the value of the drb-type IE within the SCG-Config IE. Alternatively, the RRC Connection Reconfiguration message may explicitly indicate the change of the bearer type from the MCG bearer to the MCG split bearer.

In Step 805, the UE 3 prepares a unified PDCP for the MCG split bearer. Similarly, in Step 806, the MeNB 1 prepares a unified PDCP for the MCG split bearer. The unified PDCP preparation by the UE 3 in Step 805 may include the following processing. The unified PDCP preparation by the MeNB 1 in Step 806 may also include similar processing.

When an MCG split bearer is directly configured, that is, when a new bearer (DRB) is originally established as an MCG split bearer, the UE 3 newly establishes, for the MCG split bearer, the PDCP entity 731 in the unified PDCP layer to provide the unified PDCP functionalities. The MeNB 1 receives from the SgNB 2, during the SgNB Addition procedure or the SgNB Modification procedure, information (e.g., SCG-Config) necessary to generate SCG configurations (Step 803), and transmits information for DRB addition (i.e., DrbToAddMod: drb-type: MCG split) to the UE 3 (Step 804).

When a MCG bearer is changed to an MCG split bearer, the UE 3 re-establishes a PDCP entity for the MCG bearer as a unified PDCP entity. The UE 3 may re-establish the unified PDCP entity by applying the unified PDCP configuration (unified PDCP-config) while reusing a part of the PDCP configuration (i.e., LTE PDCP-config) for the MCG bearer. The UE 3 may re-establish the unified PDCP entity by applying a new unified PDCP configuration.

Alternatively, when an MCG bearer is changed to an MCG split bearer, the UE 3 may reconfigure a PDCP entity for the MCG bearer as a unified PDCP entity. Alternatively, the UE 3 may switch the operation mode of the PDCP entity for the MCG bearer to the (sub) mode corresponding to the unified PDCP. The UE 3 may reconfigure the PDCP entity by applying additional PDCP configuration (unified PDCP-config) necessary to provide the unified PDCP functionalities while reusing a part of the PDCP configuration (i.e., LTE PDCP-config) for the MCG bearer.

That is, the unified PDCP configuration information (unified PDCP-config) transmitted from the MN 1 to the UE 3 may be new PDCP configuration information for the MCG split bearer (i.e., full-config). In addition, or alternatively, the unified PDCP configuration information (unified PDCP-config) transmitted from the MN 1 to the UE 3 may include PDCP configuration information to be added to the PDCP configuration (i.e., LTE PDCP-config) for the MCG bearer (i.e., delta-config), or to be deleted from the PDCP configuration for the MCG bearer, in order to configure the unified PDCP entity.

Referring back to FIG. 8, the UE 3 transmits an RRC Connection Reconfiguration Complete message to the MeNB 1 in Step 807. In Step 808, the MeNB 1 sends an SgNB Addition Complete message to the SgNB 2. In Step 809, the UE 3 performs a random access procedure to the SgNB 2. Accordingly, the UE 3 is able to receive user plane (UP) data via the MCG split bearer (Step 810).

Figure 9:
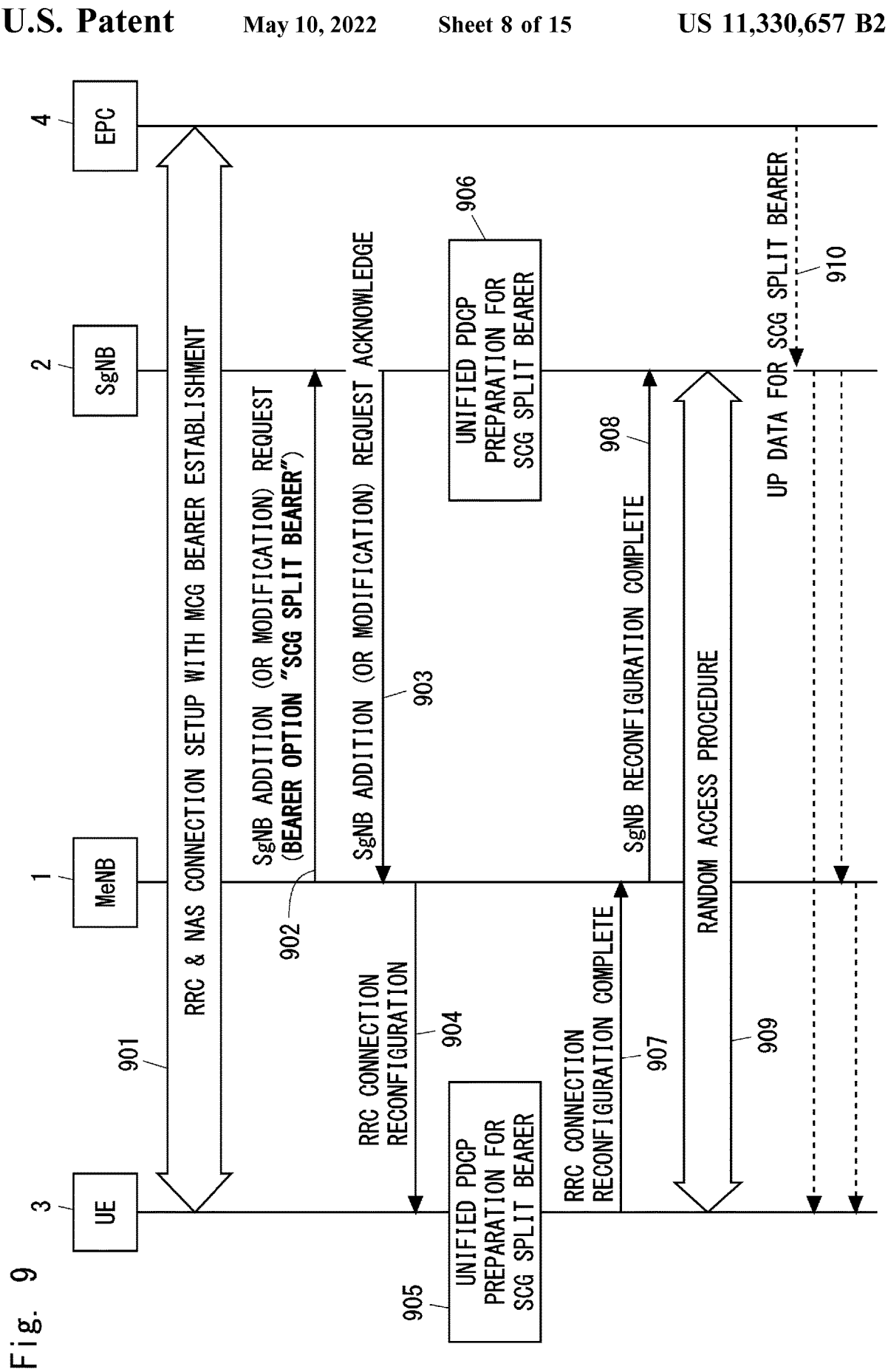
FIG. 9 is a sequence diagram showing one example of a procedure for establishing an SCG split bearer according to the first embodiment.

FIG. 9 is a sequence diagram showing one example of a procedure for establishing an SCG split bearer according to this embodiment. FIG. 9 shows an example of the EN-DC. Specifically, in FIG. 9, the MN 1 is a Master eNB (MeNB), the SN 2 is a Secondary gNB (SgNB), and the core network 4 is an EPC. The processing of Step 901 is similar to the processing of Step 801. In Step 901, the MeNB 1 receives UE capability information from the UE 3 or the EPC 4 (e.g., an MME serving as the CP node 5). This UE capability information explicitly or implicitly indicates that the UE 3 supports split bearers.

In Step 902, in order to configure an SCG split bearer for the UE 3, the MeNB 1 sends an SgNB Addition (or Modification) Request message to the SgNB 2 via the interface 603 (i.e., X2 interface). This SgNB Addition (or Modification) Request message contains a Bearer Option Information Element (IE) set to the value "SCG split bearer". This SgNB Addition (or Modification) Request message also contains an RRC container containing an SCG-ConfigInfo message. This SCG-ConfigInfo message includes configurations for the SCG split bearer and also includes a drb-type information element (IE) set to the value "SCG split".

In Step 903, the SgNB 2 sends an SgNB Addition (or Modification) Request Acknowledge message to the MeNB 1 via the interface 603 (i.e., X2 interface). This message contains an RRC container containing an SCG-Config message. This SCG-Config message includes SCG configurations for the SCG split bearer and also includes a drb-type information element (IE) set to the value "SCG split". These SCG configurations include unified PDCP configuration information (e.g., unified PDCP-config) regarding the SCG split bearer. The SCG configurations may include, for example, a DRB-ToAddModSCG IE containing a drb-type IE set to the value "scg-split" and also containing a pdcp-Config IE indicating the unified PDCP configuration.

In Step 904, the MeNB 1 transmits an RRC Connection Reconfiguration message to the UE 3. This message contains SCG configurations including the SCG-Config information element (IE) and including other information for the NR SCG. These SCG configurations include the unified PDCP configuration information (e.g., unified PDCP-config) regarding the SCG split bearer. This unified PDCP configuration information causes the UE 3 to establish, re-establish, or configure a unified PDCP entity for the SCG split bearer. The other information for the NR SCG includes, for example, SCG Security. The change of the bearer type from the MCG bearer or the SCG bearer to the SCG split bearer may be implicitly indicated by the value of the drb-type IE within the SCG-Config IE. Alternatively, the RRC Connection Reconfiguration message may explicitly indicate the change of the bearer type from the MCG bearer or the SCG bearer to the SCG split bearer.

In Step 905, the UE 3 prepares a unified PDCP for the SCG split bearer. Similarly, in Step 906, the SgNB 2 prepares a unified PDCP for the SCG split bearer. The unified PDCP preparation by the UE 3 in Step 905 may include the following processing. The unified PDCP preparation by the SgNB 2 in Step 906 may also include similar processing.

When an MCG bearer is changed to an SCG split bearer (e.g., SgNB Addition procedure), the UE 3 newly establishes, for the SCG split bearer, the PDCP entity 735 in the unified PDCP layer to provide the unified PDCP functionalities. The UE 3 may release a PDCP entity used for the MCG bearer. Alternatively, the UE 3 may maintain the PDCP entity used for the MCG bearer. The maintained PDCP entity may be used for forwarding of a flow(s) (PDU flow(s), QoS flow(s)) that have not been moved from the MCG bearer to the SCG split bearer.

When an SCG bearer is changed to an SCG split bearer (e.g., SgNB Modification procedure), the UE 3 re-establishes a PDCP entity for the SCG bearer as a unified PDCP. The UE 3 may re-establish the unified PDCP entity by applying the unified PDCP configuration (unified PDCP-config) while reusing a part of the PDCP configuration (i.e., NR PDCP-config) for the SCG bearer. The UE 3 may re-establish the unified PDCP entity by applying a new unified PDCP configuration.

Alternatively, when an SCG bearer is changed to an SCG split bearer, the UE 3 may reconfigure a PDCP entity for the SCG bearer as a unified PDCP. Alternatively, the UE 3 may switch the operation mode of the PDCP entity for the SCG bearer to the (sub) mode corresponding to the unified PDCP. The UE 3 may reconfigure the PDCP entity by applying additional PDCP configuration (unified PDCP-config) necessary to provide the unified PDCP functionalities while reusing a part of the PDCP configuration (i.e., NR PDCP-config) for the SCG bearer.

Referring back to FIG. 9, the UE 3 transmits an RRC Connection Reconfiguration Complete message to the MeNB 1 in Step 907. In Step 908, the MeNB 1 sends an SgNB Addition Complete message to the SgNB 2. In Step 909, the UE 3 performs a random access procedure to the SgNB 2. Accordingly, the UE 3 is able to receive user plane (UP) data via the SCG split bearer (Step 910).

Second Embodiment

This embodiment provides a modified example of the implementation of the unified PDCP layer in the radio communication network described in the first embodiment. A configuration example of a radio communication network according to this embodiment is similar to the example shown in FIG. 6. Radio protocol architecture for MCG and SCG split bearers according to this embodiment is similar to the example shown in FIG. 7.

In this embodiment, an MN 1 and a UE 3 are configured to, when they starts the MR-DC, use a unified PDCP entity for a newly configured MCG split bearer, SCG bearer, or SCG split bearer. The MN 1 and the UE 3 are further configured to, when they starts the MR-DC, use the unified PDCP entity, which provides the unified PDCP functionalities, also for an already established MCG bearer for the UE 3. In other words, when the UE 3 supporting split bearers in MR-DC starts the MR-DC, the MN 1 and the UE 3 use a unified PDCP entity also for an MCG bearer for the UE 3, regardless of whether an MCG split bearer is used for the UE 3.

When the MN 1 starts the MR-DC with the UE 3, the MN 1 may newly (again) establish a unified PDCP entity as the PDCP entity for the already established MCG bearer of the UE 3. The MN 1 may reuse a part of the PDCP configuration (e.g., LTE PDCP-config) or DRB configuration (e.g., LTE DRB config) of the MCG bearer.

Alternatively, when the MN 1 starts MR-DC with the UE 3, the MN 1 may re-establish the PDCP entity for the already established MCG bearer of the UE 3 in such a way that it provides the unified PDCP functionalities. The MN 1 may re-establish the PDCP entity for the MCG bearer by applying the unified PDCP configuration (unified PDCP-config) while re-using a part of the PDCP configuration (e.g., LTE PDCP-config) of the MCG bearer. The MN 1 may re-establish the PDCP entity for the MCG bearer by applying the new unified PDCP configuration.

Alternatively, when the MN 1 starts MR-DC with the UE 3, the MN 1 may reconfigure the PDCP entity for the already established MCG bearer of the UE 3 in such a way that it provides the unified PDCP functionalities. Alternatively, the UE 3 may switch the operation mode of the PDCP entity of the already established MCG bearer to the (sub) mode corresponding to the unified PDCP. The MN 1 may reconfigure the PDCP entity for the MCG bearer by applying additional PDCP configuration (unified PDCP-config) for providing the unified PDCP functionalities while re-using a part of the PDCP configuration (e.g., LTE PDCP-config) of the MCG bearer.

In a similar way, in this embodiment, the UE 3 is configured to, when the UE 3 starts MR-DC, use the unified PDCP entity for a newly configured MCG split bearer, SCG bearer, or SCG split bearer. The UE 3 is further configured to, when the UE 3 starts MR-DC, use the unified PDCP entity, which provides the unified PDCP functionalities, also for the already established MCG bearer. In other words, when the UE 3 supporting split bearers starts the MR-DC, this UE 3 uses a unified PDCP entity also for an MCG bearer, regardless of whether an MCG split bearer is used for this UE 3.

Figure 10:
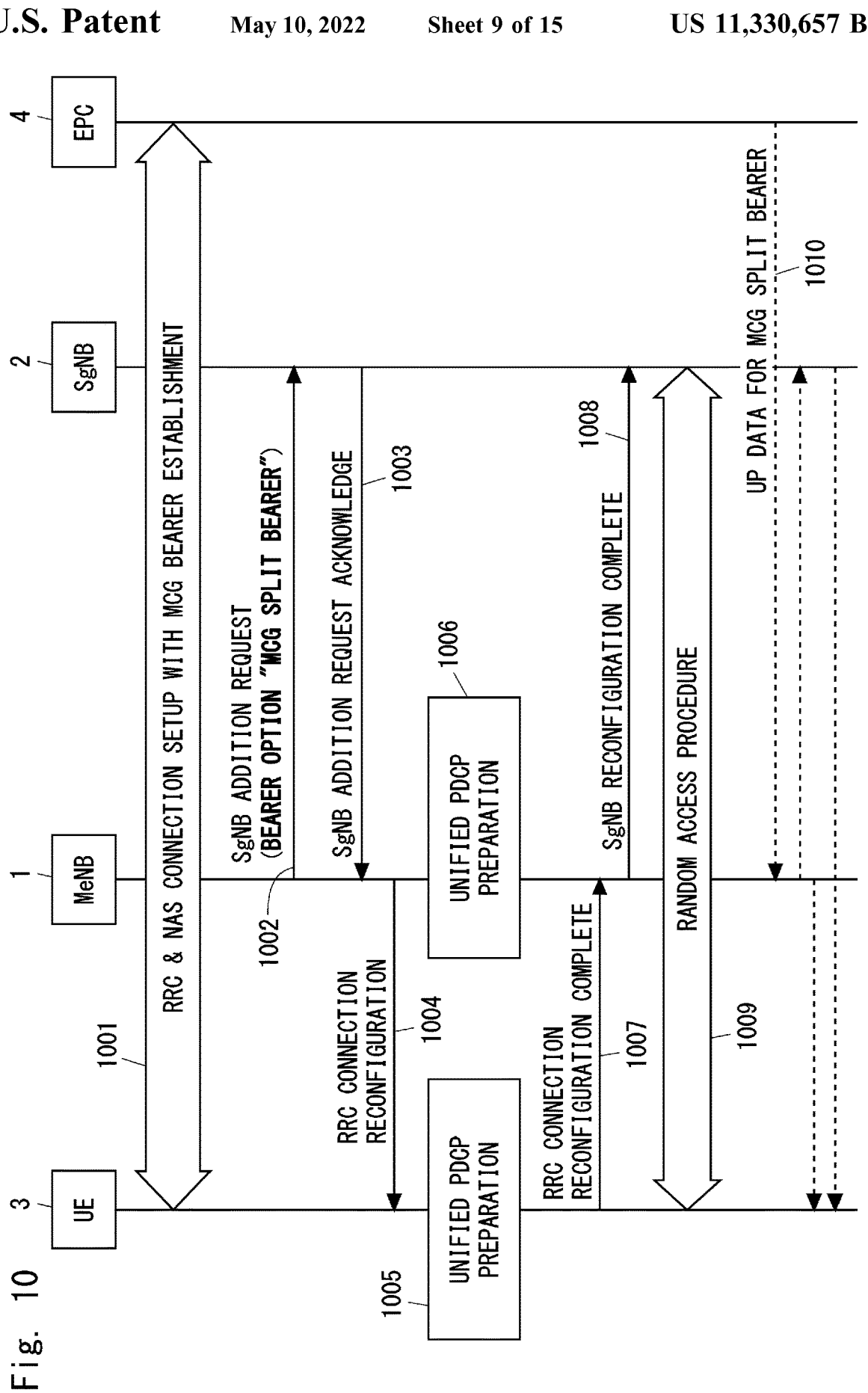
FIG. 10 is a sequence diagram showing one example of an MR-DC starting procedure involving establishment of an MCG split bearer according to a second embodiment.

FIG. 10 is a sequence diagram showing one example of an MR-DC starting procedure involving establishment of an MCG split bearer according to this embodiment. FIG. 10 shows an example of the EN-DC. Specifically, in FIG. 10, the MN 1 is a Master eNB (MeNB), the SN 2 is a Secondary gNB (SgNB), and the core network 4 is an EPC. The processing of Step 1001 is similar to the processing of Step 801 in FIG. 8. In Step 1001, the MeNB 1 receives UE capability information from the UE 3 or the EPC 4 (e.g., an MME serving as the CP node 5). This UE capability information explicitly or implicitly indicates that the UE 3 supports split bearers.

In Step 1002, in order to start the EN-DC with the UE 3, the MeNB 1 sends an SgNB Addition Request message to the SgNB 2 via the interface 603 (i.e., X2 interface). This SgNB Addition Request message contains information elements (IEs) similar to those contained in the SgNB Addition (or Modification) Request message of Step 802 in FIG. 8.

In Step 1003, the SgNB 2 sends an SgNB Addition Request Acknowledge message to the MeNB 1 via the interface 603 (i.e., X2 interface). This gNB Addition Request Acknowledge message contains information elements (IEs) similar to those contained in the SgNB Addition (or Modification) Request Acknowledge message of Step 803 in FIG. 8.

The processing of Steps 1004-1010 is similar to the processing of Steps 804-810 in FIG. 8. However, the RRC Connection Reconfiguration message of Step 1004 further includes unified PDCP configuration information regarding an MCG bearer. For example, this RRC Connection Reconfiguration message may include a DRB-ToAddModList IE indicating addition and deletion of MCG bearers, or indicating modification of MCG bearers, and the DRB-ToAddModList IE may also include a DRB-ToAddMod IE that contains a pdcp-Config IE indicating the unified PDCP configuration. In Step 1005, as well as the preparation of a unified PDCP entity for an MCG split bearer, the UE 3 establishes, re-establishes, or reconfigures a PDCP entity for an already established MCG bearer in order to apply the unified PDCP also to this MCG bearer. Alternatively, the UE 3 may switch the operation mode of the PDCP entity of the already established MCG bearer to the (sub) mode corresponding to the unified PDCP. In a similar way, in Step 1006, as well as the preparation of a unified PDCP entity for an MCG split bearer, the MeNB 1 establishes, re-establishes, or reconfigures a PDCP entity for an MCG bearer already established for the UE 3 in order to apply the unified PDCP also to this MCG bearer. Alternatively, the MeNB 1 may switch the operation mode of the PDCP entity of the MCG bearer already established for the UE 3 to the (sub) mode corresponding to the unified PDCP.

Figure 11:
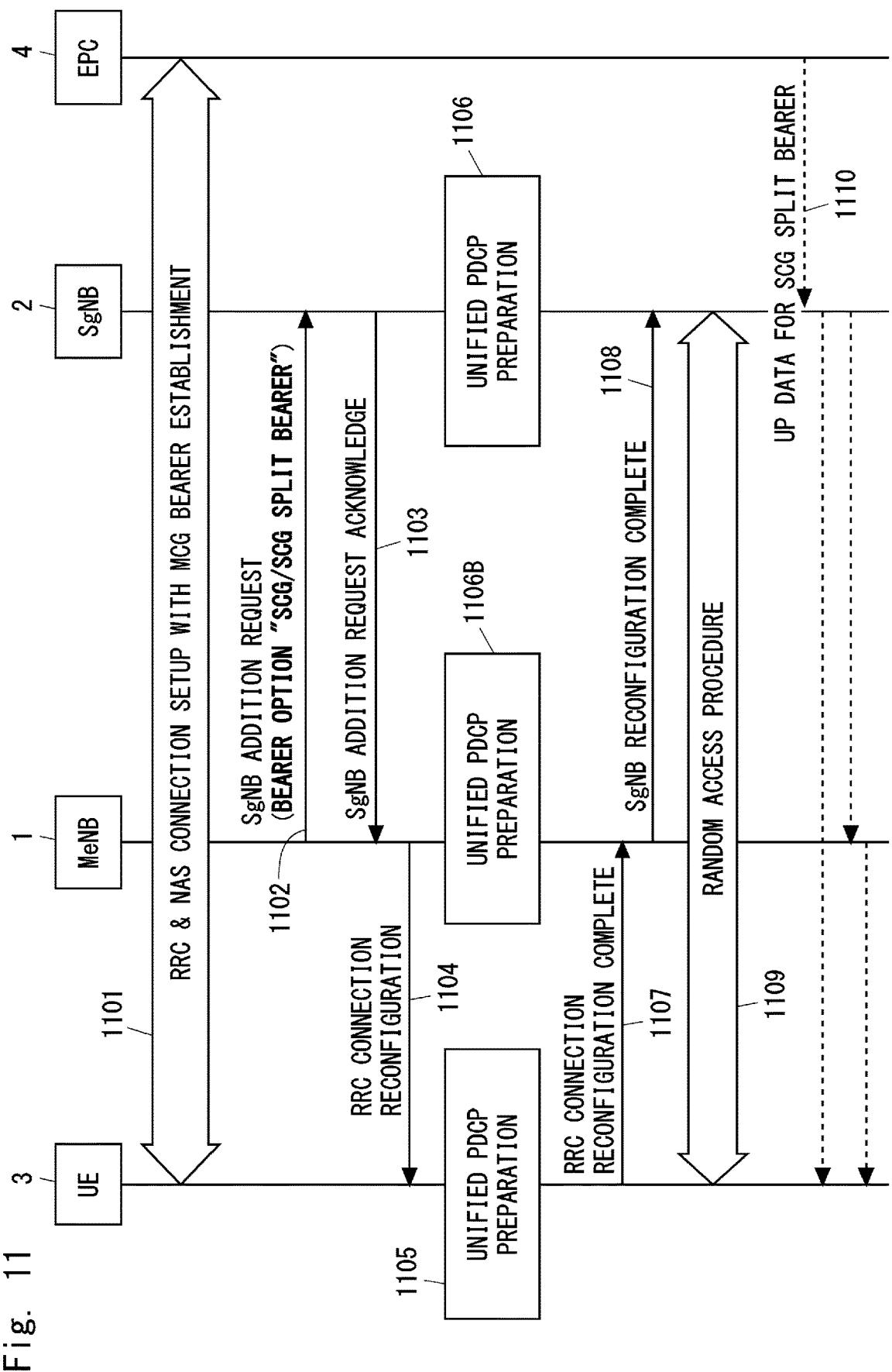
FIG. 11 is a sequence diagram showing one example of an MR-DC starting procedure involving establishment of an SCG bearer or an SCG split bearer according to the second embodiment.

FIG. 11 is a sequence diagram showing one example of an MR-DC starting procedure involving establishment of an SCG bearer or an SCG split bearer according to this embodiment. FIG. 11 shows an example of the EN-DC. Specifically, in FIG. 11, the MN 1 is a Master eNB (MeNB), the SN 2 is a Secondary gNB (SgNB), and the core network 4 is an EPC. The processing of Step 1101 is similar to the processing of Step 1101 in FIG. 8. In Step 1101, the MeNB 1 receives UE capability information from the UE 3 or the EPC 4 (e.g., an MME serving as the CP node 5). This UE capability information explicitly or implicitly indicates that the UE 3 supports split bearers.

In Step 1102, in order to start the EN-DC with the UE 3, the MeNB 1 sends an SgNB Addition Request message to the SgNB 2 via the interface 603 (i.e., X2 interface). This SgNB Addition Request message contains a Bearer Option information element (IE) set to the value "SCG bearer" or "SCG split bearer". This SgNB Addition (or Modification) Request message also contains an RRC container including an SCG-ConfigInfo message. This SCG-ConfigInfo message includes configurations for an SCG split bearer and also includes a drb-type information element (IE) set to the value "SCG" or "SCG split".

In Step 1103, the SgNB 2 sends an SgNB Addition Request Acknowledge message to the MeNB 1 via the interface 603 (i.e., X2 interface). This message contains an RRC container containing an SCG-Config message. This SCG-Config message includes SCG configurations for an SCG split bearer and also includes a drb-type information element (IE) set to the value "SCG" or "SCG split".

The processing of Steps 1104-1110 is similar to the processing of Steps 904-910 in FIG. 9. However, the RRC Connection Reconfiguration message of Step 1104 further includes unified PDCP configuration information regarding an MCG bearer. For example, this RRC Connection Reconfiguration message may include a DRB-ToAddModList IE indicating addition and deletion of MCG bearers, or modification of MCG bearers, and the DRB-ToAddModList IE may include a DRB-ToAddMod IE that contains a pdcp-Config IE indicating the unified PDCP configuration. In Step 1105, as well as the preparation of a unified PDCP entity for an SCG bearer or an SCG split bearer, the UE 3 establishes, re-establishes, or reconfigures a PDCP entity for an already established MCG bearer, or switch the (sub) mode of the PDCP entity for this MCG bearer, in order to apply the unified PDCP also to this MCG bearer. In Step 1106, the SgNB 2 prepares the unified PDCP for the SCG split bearer or the SCG bearer.

The procedure shown in FIG. 11 further includes Step 1106B. In Step 1006B, the MeNB 1 establishes, re-establishes, or reconfigures a PDCP entity for an MCG bearer already established for the UE 3, or switches the (sub) mode of the PDCP entity for this MCG bearer, in order to apply the unified PDCP also to this MCG bearer.

As described above, when starting the MR-DC, the radio communication system according to this embodiment applies the unified PDCP to other bearers, such as an already established MCG bearer, as well as applying to the split bearer. Accordingly, it is possible to reduce a processing delay in a bearer type change to a split bearer from another bearer type (MCG bearer, SCG bearer) or a bearer type change from a split bearer to another bearer type. The processing delay here includes, for example, re-establishment of at least one of a PDCP entity and an RLC entity, or reset of a MAC entity, or both.

Third Embodiment

This embodiment provides a modified example of the implementation of the unified PDCP layer in the radio communication network described in the second embodiment. A configuration example of a radio communication network according to this embodiment is similar to the example shown in FIG. 6. Radio protocol architecture for MCG and SCG split bearers according to this embodiment is similar to the example shown in FIG. 7.

In this embodiment, the SN 2 and the UE 3 are configured to, when establishing for an SCG split bearer a unified PDCP entity providing the unified PDCP functionalities, establish, re-establish, or reconfigure a PDCP entity for an already established SCG bearer, or switch the (sub) mode of the PDCP entity for this SCG bearer, in such a way that it provides the unified PDCP functionalities.

Fourth Embodiment

This embodiment provides a modified example of the implementation of the unified PDCP layer in the radio communication network described in the first and second embodiments. A configuration example of a radio communication network according to this embodiment is similar to the example shown in FIG. 6. Radio protocol architecture for MCG and SCG split bearers according to this embodiment is similar to the example shown in FIG. 7.

In this embodiment, the MN 1 is configured to, if the UE 3 does not support split bearers in the MR-DC, use, for an MCG bearer for the UE 3, a PDCP entity that provides the MN PDCP functionalities corresponding to the master RAT. The MN 1 is further configured to, if the UE 3 supports split bearers in the MR-DC, use, for an MCG bearer for the UE 3, a unified PDCP entity that provides the unified PDCP functionalities regardless of whether the MR-DC is started for the UE 3. In other words, the MN 1 is configured to, if the UE 3 supports split bearers in the MR-DC, use a unified PDCP entity for an MCG bearer for the UE 3 before the MR-DC is started for the UE 3.

The UE 3 is configured to, if the UE 3 does not support split bearers in the MR-DC, use, for an MCG bearer for the UE 3, a PDCP entity that provides the MN PDCP functionalities corresponding to the master RAT. The UE 3 is further configured to, if the UE 3 supports split bearers in the MR-DC, use, for an MCG bearer for the UE 3, a unified PDCP entity that provides the unified PDCP functionalities regardless of whether the MR-DC is started for the UE 3. In other words, the UE 3 is configured to, if the UE 3 supports split bearers in the MR-DC, use a unified PDCP entity for an MCG bearer for the UE 3 before the MR-DC is started for the UE 3.

Figure 12:
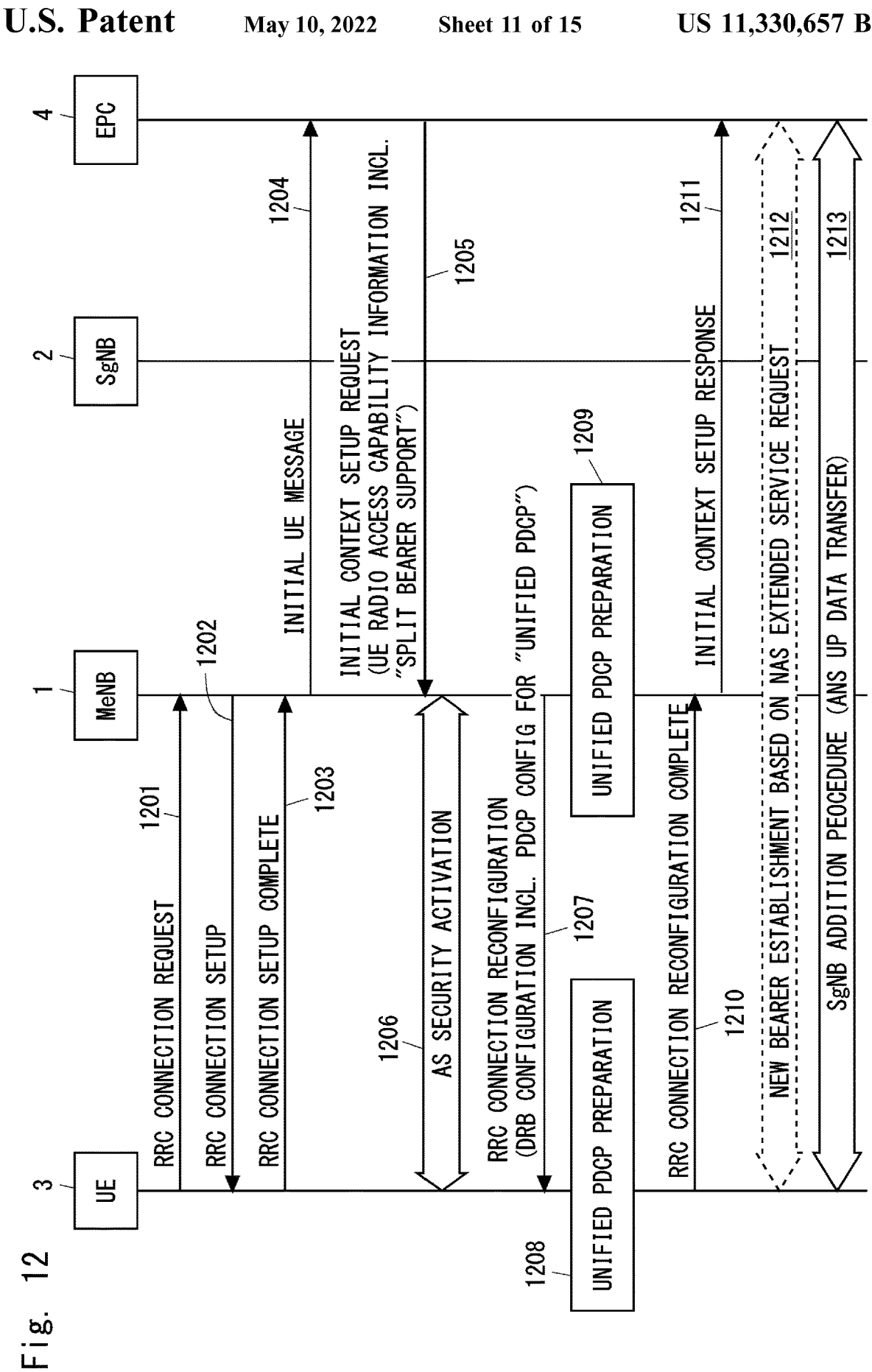
FIG. 12 is a sequence diagram showing one example of a procedure for establishing an RRC connection and a user plane bearer according to a fourth embodiment.

FIG. 12 is a sequence diagram showing one example of a procedure for establishing an RRC connection and a user plane bearer according to this embodiment. FIG. 12 shows an example of the EN-DC. Specifically, in FIG. 12, the MN 1 is a Master eNB (MeNB), the SN 2 is a Secondary gNB (SgNB), and the core network 4 is an EPC.

Steps 1201-1203 show an RRC connection establishment procedure. In Step 1201, the UE 3 transmits an RRC Connection Request message to the MeNB 1. In Step 1202, the MeNB 1 transmits an RRC Connection Setup message to the UE 3. In Step 1203, the UE 3 transmits an RRC Connection Setup Complete message to the MeNB 1. The RRC Connection Setup Complete message includes an initial NAS message (e.g., Service Request message) from the UE 3 to the EPC 4.

In Step 1204, the MeNB 1 sends to the EPC 4 an INITIAL UE MESSAGE message that contains the initial NAS message received from the UE 3. In Step 1205, the EPC 4 (e.g., an MME serving as the CP node 5) sends an INITIAL CONTEXT SETUP REQUEST message to the MeNB 1. This INITIAL CONTEXT SETUP REQUEST message contains UE radio access capability information including a UE capability information element indicating that the UE 3 supports split bearers (e.g., "Split Bearer Support" or "Unified Bearer Support"). The name of the UE capability information element (IE) indicating the support of split bearers in the MR-DC may be "Unified PDCP Support", "EN-DC Support", "NG-EN-DC Support", or "NE-DC Suppoort".

In Step 1206, the MeNB 1 performs Access Stratum (AS) security activation with the UE 3.

In Step 1207, the MeNB 1 transmits an RRC Connection Reconfiguration message to the UE 3. This RRC Connection Reconfiguration message contains DRB configuration to be applied to an MCG bearer. This PDCP configuration (PDCP-Config) contains PDCP configuration (PDCP-Config) to use the unified PDCP for the MCG bearer.

In Step 1208, the UE 3 prepares a unified PDCP for the MCG bearer. In a similar way, in Step 1209, the MeNB 1 prepares a unified PDCP for the MCG bearer. Specifically, each of the MeNB 1 and the UE 3 newly establishes a unified PDCP entity as the PDCP entity for the MCG bearer.

In Step 1210, the UE 3 transmits an RRC Connection Reconfiguration Complete message to the MeNB 1. In Step 1211, the MeNB 1 sends an INITIAL CONTEXT SETUP RESPONSE message to the EPC 4.

In Step 1212, establishment of a new (MCG) bearer based on a NAS Extended Service Request message may be performed.

In Step 1213, an SgNB Addition procedure for starting the MR-DC (i.e., EN-DC in this example) is performed. This SgNB Addition procedure may be performed in accordance with, for example, one of the specific examples (FIG. 8 or 9) described in the first embodiment.

In the procedure shown in FIG. 12, the EPC 4 (e.g., an MME serving as the CP node 5) sends to the MeNB 1 the UE capability information indicating that the UE 3 supports split bearers. Alternatively, the UE 3 may transmit this UE capability information to the MeNB 1.

In some implementations, the UE 3 may transmit the UE capability information to the MeNB 1 during the RRC connection establishment procedure (Steps 1201-1203).

In some implementations, the UE 3 may transmit the UE capability information to the MeNB 1 using the RRC Connection Request message (Step 1201). Accordingly, the MeNB 1 is able to know whether the UE 3 supports split bearers prior to the establishment of the RRC connection. Thus, for example, the MeNB 1 is able to use the unified PDCP for a PDCP configuration of a signalling radio bearer (SRB 1) for transferring RRC messages. Specifically, the MeNB 1 may transmit to the UE 3 an RRC Connection Setup message (Step 1202) that contains information indicating use of the unified PDCP (Unified PDCP indication) or contains a PDCP configuration corresponding to the unified PDCP functionalities.

In some implementations, the UE 3 may transmit the UE capability information to the MeNB 1 using a third message (i.e., Message 3 (Msg3)) in a random access procedure, instead of using the RRC Connection Request message. The third message in the random access procedure carrying the UE capability information may be, for example, an RRC Connection Re-establishment Request message, an RRC Connection Resume Request message, or an RRC Connection Activation Request message. The RRC Connection Activation Request message is a message transmitted by a UE to request transition from an RRC_INACTIVE state (which is newly introduced in 5G) to an RRC_CONNECTED state.

The UE capability information sent from the UE 3 to the MeNB 1 during the RRC connection establishment procedure may be referred to as "Early UE Capability Indication". This UE capability information may be defined to be an RRC information element (IE). This RRC IE may be called, for example, a "splitBearer (Support) IE", a "unifiedBearer (Support) IE", or a "unifiedPDCP (Support) IE". This UE capability information may be an Inter-Operability Test (IOT) bit. This IOT bit is a flag indicating completion of an Inter-Operability Test. Alternatively, an RRC IE (e.g., earlyCapabilityIndication IE) for Early UE Capability Indication to be used for multiple purposes may be defined, and the information regarding the MR-DC may be collected in a single field (e.g., MultiRAT-DC, MR-DC) within this RRC IE. Then the UE capability information may be sent using a subfield (e.g., splitBearer subfield or unified PDCP subfield) included in the field regarding the MR-DC.

Alternatively, this UE capability information (i.e., Early UE Capability Indication) may be defined to be a MAC Control Element (CE). This MAC CE may be called, for example, a "Split Bearer (Support) MAC CE", a "Unified Bearer (Support) MAC CE", or a "Unified PDCP (Support) MAC CE". Alternatively, a MAC CE (e.g., Early Capability Indication MAC CE) for Early UE Capability Indication to be used for multiple purposes may be defined, and information regarding the MR-DC including the Early UE Capability Indication may be sent using a bitmap in this MAC CE.

Alternatively, this UE capability information (i.e., Early UE Capability Indication) may be defined to be a Logical Channel ID (LCID) of an Uplink (UL) Common Control Channel (CCCH) (i.e., UL LCID for CCCH (SRB0)). This may be defined to be a new LCID different from LCIDs for other CCCHs, in order to indicate the support of split bearers. When the UE 3 supports split bearers, the UE 3 may transmit a third message (e.g., RRC Connection Request message) using this new LCID.

According to the above methods, the network (e.g., the MN, or the SN 2, or both) is able to know at an early stage of the RRC connection establishment that the UE 3 supports split bearers in the MR-DC and the unified PDCP therefor. By using the unified PDCP from the stage of new bearer establishment, it is for example possible to omit a processing delay, such as switch between the LTE PDCP and the unified PDCP.

Figure 13:
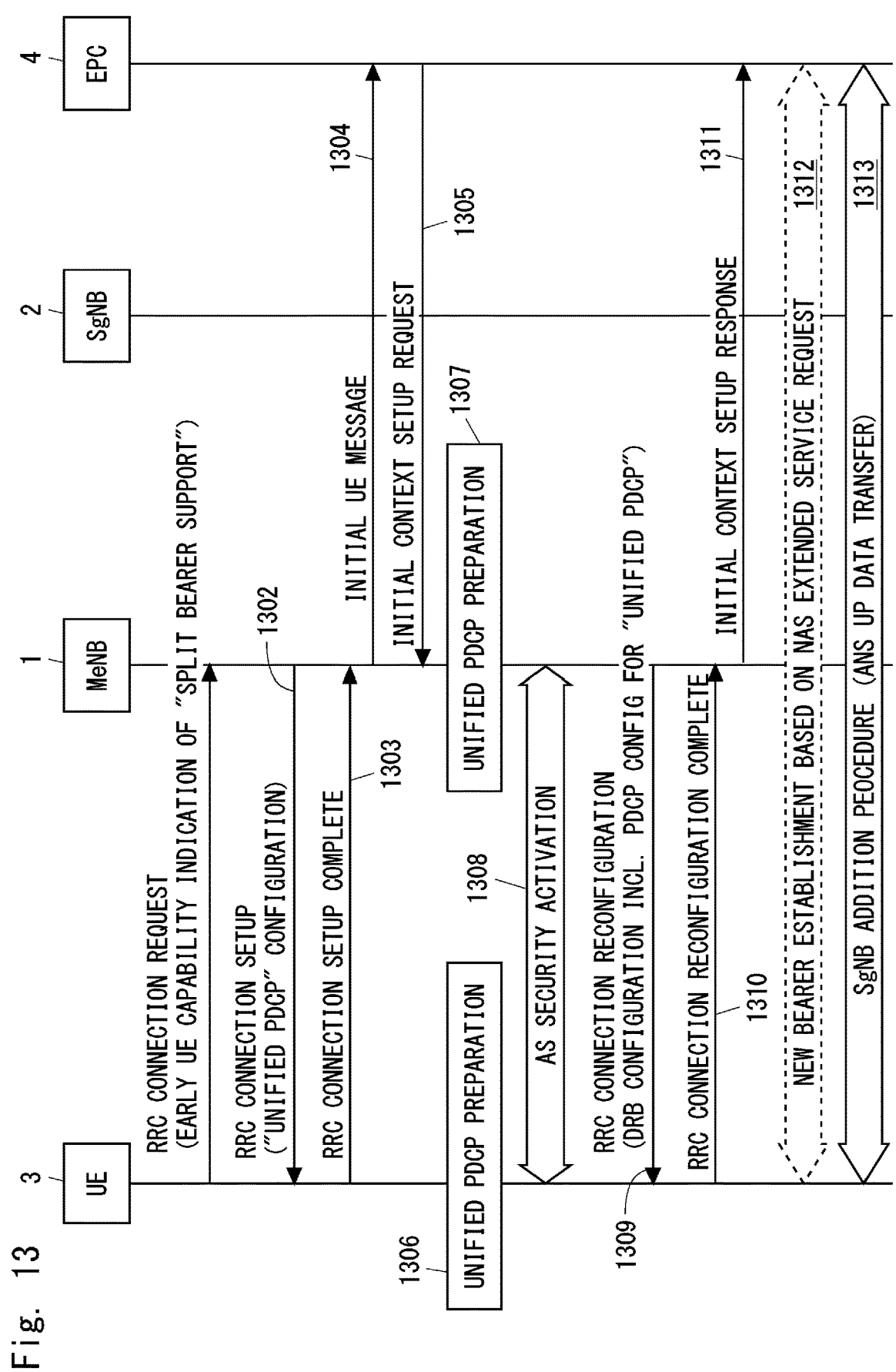
FIG. 13 is a sequence diagram showing one example of a procedure for establishing an RRC connection and a user plane bearer according to the fourth embodiment.

FIG. 13 is a sequence diagram showing an example in which the above Early UE Capability Indication is used. FIG. 13 shows an example of the EN-DC. Specifically, in FIG. 13, the MN 1 is a Master eNB (MeNB), the SN 2 is a Secondary gNB (SgNB), and the core network 4 is an EPC.

Steps 1301-1303 show an RRC connection establishment procedure. In Step 1301, the UE 3 transmits to the MeNB 1 an RRC Connection Request message containing the Early UE Capability Indication indicating the support of split bearers. In Step 1302, the MeNB 1 transmits an RRC Connection Setup message to the UE 3. This RRC Connection Setup message contains information indicating use of the unified PDCP (Unified PDCP indication), or contains a PDCP configuration corresponding to the unified PDCP functionalities. In Step 1303, the UE 3 transmits an RRC Connection Setup Complete message to the MeNB 1. The RRC Connection Setup Complete message includes an initial NAS message (e.g., Service Request message) from the UE 3 to the EPC 4.

In Step 1304, the MeNB 1 sends to the EPC 4 an INITIAL UE MESSAGE message that contains the initial NAS message received from the UE 3. In Step 1305, the EPC 4 sends an INITIAL CONTEXT SETUP REQUEST message to the MeNB 1.

In Step 1306, the UE 3 prepares the unified PDCP for a signalling radio bearer (SRB 1) for transferring RRC messages, according to the processing that will be specified in the specification for the unified PDCP, or according to the PDCP configuration received in Step 1302. In a similar way, in Step 1307, the MeNB 1 prepares the unified PDCP for the signalling radio bearer (SRB 1). That is, each of the MeNB 1 and the UE 3 newly establishes a unified PDCP entity as a PDCP entity for the signalling radio bearer (SRB 1).

In Step 1308, the MeNB 1 performs AS security activation with the UE 3. This AS security activation is performed via the signalling radio bearer (SRB 1), in which the unified PDCP is used, or to which the PDCP configuration corresponding to the unified PDCP functionalities is applied.

In Step 1309, the MeNB 1 sends an RRC Connection Reconfiguration message to the UE 3. This RRC Connection Reconfiguration message contains a DRB configuration to be applied to an MCG bearer. This PDCP configuration (PDCP-Config) contains PDCP configuration (PDCP-Config) to use the unified PDCP for the MCG bearer.

The processing of Steps 1310-1313 is similar to the processing of Steps 1210-1213 shown in FIG. 12.

The UE 3 may perform transmission of the Early UE Capability Indication described above, only under a certain condition. The certain condition may be, for example, that information indicating support of the MR-DC (or split bearers in the MR-DC) or the unified PDCP by the MN 1 (i.e., serving RAN node, e.g., eNB or gNB) is broadcast in the serving cell (e.g., PCell) of the UE 3. The certain condition may be that information indicating that the MN 1 allows transmission of the Early UE Capability Indication is broadcast in the serving cell of the UE 3. Alternatively, the MN 1 may request the UE 3 for the Early UE Capability Indication via a Message 4 (e.g., RRC Connection Setup) in the random access procedure and the UE 3 may transmit the Early UE Capability Indication via a Message 5 (e.g., RRC Connection Setup Complete) in response to the request.

Fifth Embodiment

This embodiment provides specific examples of the unified PDCP configuration described in the first to fourth embodiments. A configuration example of a radio communication network according to this embodiment is similar to the example shown in FIG. 6. Radio protocol architecture for MCG and SCG split bearers according to this embodiment is similar to the example shown in FIG. 7.

As one example, the LTE PDCP-config may include at least one of: discardTimer; rlc-AM; rlc-UM; headerCompression; rn-IntegrityProtection; pdcp-SN-Size; ul-DataSplitDRB-ViaSCG; and t-Reordering.

The discardTimer field indicates duration (ms) during which a PDCP SDU acquired from the upper layer is valid. When the discardTimer is expired or the successful delivery of a PDCP SDU is confirmed by PDCP status report, the UE discards the PDCP SDU.

The rlc-AM field is a field that is necessary to setup a PDCP entity for a Radio bearer configured with the RLC Acknowledge Mode (AM). The rlc-AM includes "statusReportRequired" indicating whether the UE should transmit a PDCP status report in response to a PDCP entity re-establishment and a PDCP data recovery.

The rlc-UM field is a field that is necessary to setup a PDCP entity for a Radio bearer configured with the RLC Unacknowledged Mode (UM). The rlc-UM includes pdcp-SN-Size (i.e., 7 bits, 12 bits, 15 bits, or 18 bits).

The headerCompression field includes robust header compression (ROHC) information to be used for Header Compression performed in the PDCP layer. The ROHC information further includes a maximum Context Identifier (maxCID) and profiles. The profiles define a specific combination of the protocols of the network layer, transport layer, and upper layer thereof.

The rn-IntegrityProtection field indicates whether integrity protection or verification shall be applied for all subsequent packets received and sent by a Relay node.

The ul-DataSplitDRB-ViaSCG field indicates whether the UE shall transmit PDCP PDUs via SCG.

The t-Reordering field indicates the value (ms) of a Reordering Timer.

On the other hand, the NR PDCP-config may include at least one of the information elements included in the existing LTE PDCP-config. For example, as described above, the number of the possible values of the pdcp-SN-Size within the NR PDCP-config may be smaller (i.e., 12 bits or 18 bits)

than that of the possible values of the pdcp-SN-Size in the NR PDCP-config. In addition, or alternatively, the NR PDCP-config may include an additional information element that is not included in the existing LTE PDCP-config. The additional information element may include "ul-DataSplitDRB-ViaUnifiedSplitBearer" (or u"l-DataSplitDRB-ViaMCGSplitBearer", or "ul-DataSplitDRB-ViaSCGSplitBearer") indicating whether the UE shall transmit PDCP PDUs via a unified split bearer (or an MCG split bearer, or an SCG Split bearer). The additional information element may include information regarding acquisition of SDAP PDUs from an SDAP sublayer, or delivery of PDCP SDUs to an SDAP sublayer.

As described above, the Unified PDCP config may be the same as the NR PDCP-config or the LTE PDCP-config, may be a subset of the NR PDCP-config or the LTE PDCP-config, or may be a common subset (common part) between the NR PDCP-config and the LTE PDCP-config.

The NR PDCP-config may be included in the LTE PDCP-config as a subset thereof and transmitted from the MN 1 to the UE 3, or it may be transmitted from the MN 1 to the UE 3 in addition to the LTE PDCP-config.

The Unified PDCP config may be included in the LTE PDCP-config or the NR PDCP-config as a subset thereof and transmitted from the MN 1 to the UE 3, or it may be transmitted from the MN 1 to the UE 3 in addition to the LTE PDCP-config and the NR PDCP-config.

When the Unified PDCP config is included in each of the LTE PDCP-config and the NR PDCP-config as a subset thereof, the UE 3 may recognize that the Unified PDCP config is activated under a condition that the two Unified PDCP configs respectively included in the LTE PDCP-config and the NR PDCP-config at least partially coincide with one another.

Figure 14:
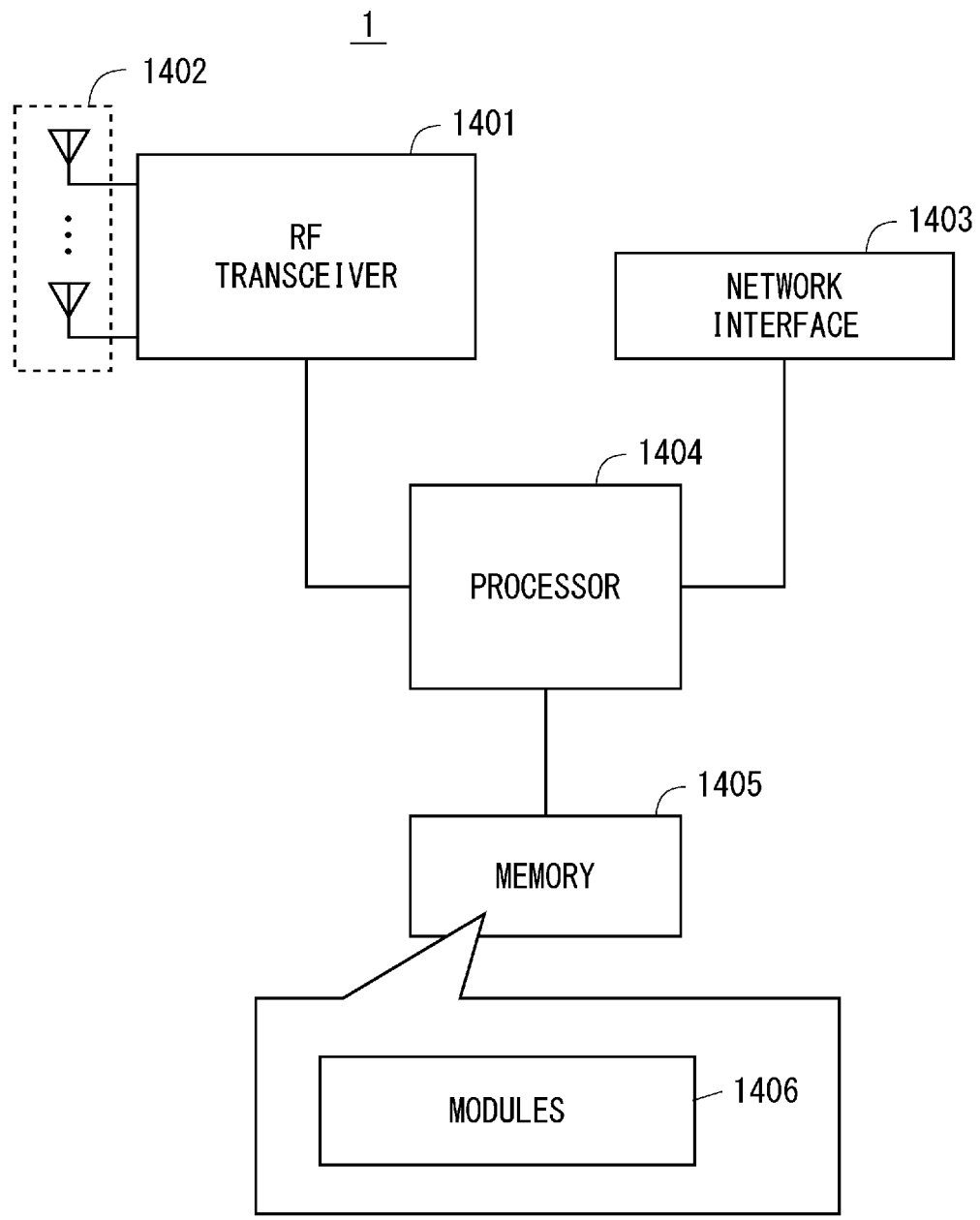
FIG. 14 is a block diagram showing a configuration example of a master node according to a plurality of embodiments.

The following provides configuration examples of the MN 1, the SN 2, the UE 3, and the CP node 5 according to the above-described embodiments. FIG. 14 is a block diagram showing a configuration example of the MN 1 according to the above-described embodiments. The configuration of the SN 2 may be similar to that shown in FIG. 14. Referring to FIG. 14, the MN 1 includes a Radio Frequency transceiver 1401, a network interface 1403, a processor 1404, and a memory 1405. The RF transceiver 1401 performs analog RF signal processing to communicate with UEs including the UE 3. The RF transceiver 1401 may include a plurality of transceivers. The RF transceiver 1401 is coupled to an antenna array 1402 and the processor 1404. The RF transceiver 1401 receives modulated symbol data from the processor 1404, generates a transmission RF signal, and supplies the transmission RF signal to the antenna array 1402. Further, the RF transceiver 1401 generates a baseband reception signal based on a reception RF signal received by the antenna array 1402 and supplies the baseband reception signal to the processor 1404.

The network interface 1403 is used to communicate with network nodes (e.g., the SN 2, the CP node 5, and the UP node 6). The network interface 1403 may include, for example, a network interface card (NIC) conforming to the IEEE 802.3 series.

The processor 1404 performs digital baseband signal processing (i.e., data-plane processing) and control-plane processing for radio communication. The processor 1404 may include a plurality of processors. The processor 1404 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing.

The memory 1405 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1405 may include a storage located apart from the processor 1404. In this case, the processor 1404 may access the memory 1405 via the network interface 1403 or an I/O interface (not shown).

The memory 1405 may store one or more software modules (computer programs) 1406 including instructions and data to perform processing by the MN 1 described in the above-described embodiments. In some implementations, the processor 1404 may be configured to load the software modules 1406 from the memory 1405 and execute the loaded software modules, thereby performing processing of the MN 1 described in the above-described embodiments.

Figure 15:
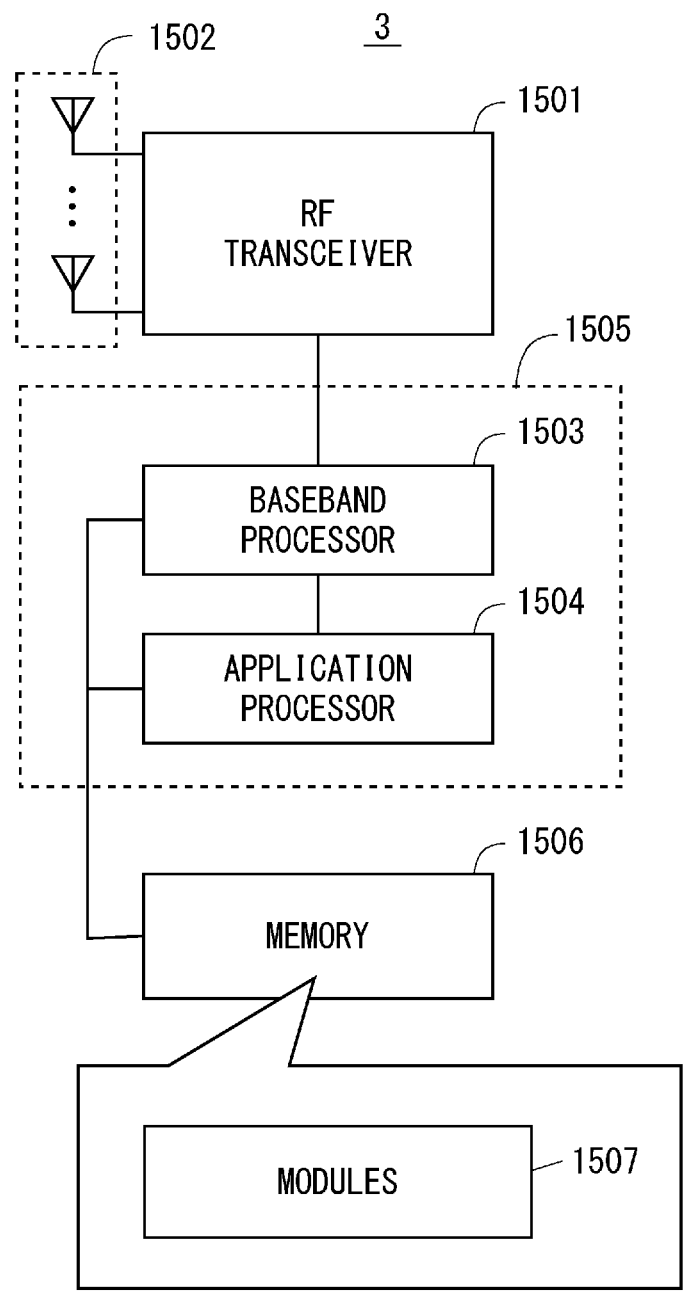
FIG. 15 is a block diagram showing a configuration example of a UE according to a plurality of embodiments.

FIG. 15 is a block diagram showing a configuration example of the UE 3. A Radio Frequency (RF) transceiver 1501 performs analog RF signal processing to communicate with the MN 1 and the SN 2. The RF transceiver 1501 may include a plurality of transceivers. The analog RF signal processing performed by the RF transceiver 1501 includes frequency up-conversion, frequency down-conversion, and amplification. The RF transceiver 1501 is coupled to an antenna array 1502 and a baseband processor 1503. The RF transceiver 1501 receives modulated symbol data (or OFDM symbol data) from the baseband processor 1503, generates a transmission RF signal, and supplies the transmission RF signal to the antenna array 1502. Further, the RF transceiver 1501 generates a baseband reception signal based on a reception RF signal received by the antenna array 1502 and supplies the baseband reception signal to the baseband processor 1503.

The baseband processor 1503 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1503 may include, for example, signal processing of a Packet Data Convergence Protocol (PDCP) layer, a Radio Link Control (RLC) layer, a MAC layer, and a PHY layer. Further, the control-plane processing performed by the baseband processor 1503 may include processing of a Non-Access Stratum (NAS) protocol, an RRC protocol, and MAC CEs.

The baseband processor 1503 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 1504 described in the following.

The application processor 1504 is also referred to as a CPU, an MPU, a microprocessor, or a processor core. The application processor 1504 may include a plurality of processors (processor cores). The application processor 1504 loads a system software program (Operating System (OS)) and various application programs (e.g., a call application, a WEB browser, a mailer, a camera operation application, and a music player application) from a memory 1506 or from another memory (not shown) and executes these programs, thereby providing various functions of the UE 3.

In some implementations, as represented by a dashed line (1505) in FIG. 15, the baseband processor 1503 and the application processor 1504 may be integrated on a single chip. In other words, the baseband processor 1503 and the application processor 1504 may be implemented in a single System on Chip (SoC) device 1505. An SoC device may be referred to as a Large Scale Integration (LSI) or a chipset.

The memory 1506 is a volatile memory, a non-volatile memory, or a combination thereof. The memory 1506 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 1506 may include, for example, an external memory device that can be accessed from the baseband processor 1503, the application processor 1504, and the SoC 1505. The memory 1506 may include an internal memory device that is integrated in the baseband processor 1503, the application processor 1504, or the SoC 1505. Further, the memory 1506 may include a memory in a Universal Integrated Circuit Card (UICC).

The memory 1506 may store one or more software modules (computer programs) 1507 including instructions and data to perform the processing by the UE 3 described in the above-described embodiments. In some implementations, the baseband processor 1503 or the application processor 1504 may load these software modules 1507 from the memory 1506 and execute the loaded software modules, thereby performing the processing of the UE 3 described in the above-described embodiments with reference to the drawings.

Figure 16:
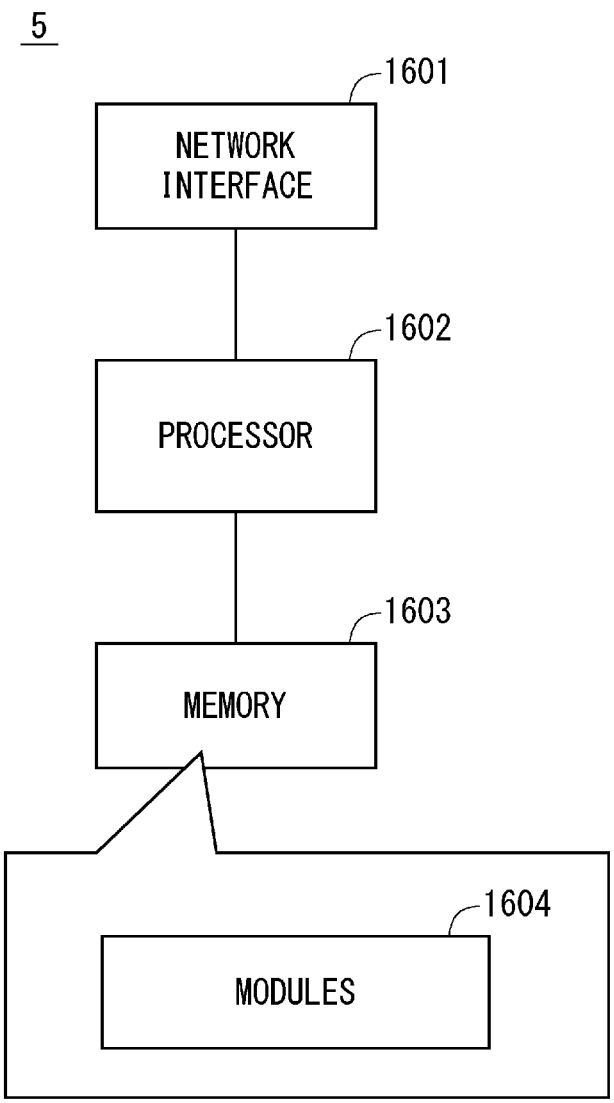
FIG. 16 is a block diagram showing a configuration example of a core network node according to a plurality of embodiments.

FIG. 16 is a block diagram showing a configuration example of the CP node 5 according to the above-described embodiments. Referring to FIG. 16, the CP node 5 includes a network interface 1601, a processor 1602, and a memory 1603. The network interface 1601 is used to communicate with network nodes (e.g., RAN nodes and other core network nodes). The network interface 1601 may include, for example, a network interface card (NIC) conforming to the IEEE 802.3 series.

The processor 1602 may be, for example, a microprocessor, an MPU, or a CPU. The processor 1602 may include a plurality of processors.

The memory 1603 is composed of a combination of a volatile memory and a nonvolatile memory. The volatile memory is, for example, an SRAM, a DRAM, or a combination thereof. The non-volatile memory is, for example, an MROM, a PROM, a flash memory, a hard disc drive, or any combination thereof. The memory 1603 may include a storage located apart from the processor 1602. In this case, the processor 1602 may access the memory 1603 via the network interface 1601 or an I/O interface (not shown).

The memory 1603 may store one or more software modules (computer programs) 1604 including instructions and data to perform the processing of the CP node 5 described in the above-described embodiments. In some implementations, the processor 1602 may be configured to load the one or more software modules 1604 from the memory 1603 and execute the loaded software modules, thereby performing the processing of the CP node 5 described in the above-described embodiments.

As described above with reference to FIGS. 14, 15, and 16, each of the processors included in the MN 1, the SN 2, the UE 3, and the CP node 5 according to the above-described embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The above-described embodiments have mainly described as to the examples of the EN-DC. The configurations and operations of the apparatuses described in these embodiments may be used for the NE-DC and the NG-EN-DC.

The above-described embodiments have provided the examples in which the information elements (e.g., SCG-ConfigInfo, SCG-Config) and messages transmitted between the MN 1 and the SN 2 have the names and the configurations assuming the LTE DC. However, the names and the configurations of the information elements and message for the MR-DC may not be the same as those of the LTE DC. For example, at least some of the information elements included in the SCG-ConfigInfo and the SCG-Config may be defined to be information elements of the X2 interface (or the Xn interface) between the MN 1 and the SN 2.

The above-described embodiments have been mainly described as to DRBs and MCG SRBs. However, the unified PDCP described in the above-described embodiments may be used for other radio bearers including an MCG Split SRB and an SCG SRB. Further, the configuration (or establishment) of the unified PDCP may be implicitly indicated by the configuration of the split bearer (e.g., DRB configuration with drbType "split"). Alternatively, the flag "unified" to explicitly indicate configuration (or establishment) of the unified PDCP may be added to the PDCP configuration (PDCP Config).

The above-described embodiments may be applied to a mobility scenario. When the Mobility procedure is performed, for example, the MN 1, the SN 2, and the UE 3 may change (or fall back) from the unified PDCP to the existing PDCP (e.g. LTE PDCP). The mobility here may include one or both of an intra-SN change (e.g. PSCell change) and an inter-SN change (change of SN), as well as a handover. The target to be controlled here may be all bearers that are somewhat affected by the mobility. For example, when a handover is performed, all bearers that use the unified PDCP may be treated as a target of the PDCP change control. When an Intra-/inter-SN change is performed, SCG split bearers may be treated as a target of the PDCP change control. Alternatively, when the UE 3 that uses the unified PDCP in the source cell performs a handover to the target cell, the UE 3 may continuously use the unified PDCP, except for when the target cell does not support a split bearer (i.e., unified bearer or unified PDCP). When the target cell does not support a split bearer, the UE 3 may change (fall back) from the unified PDCP to the existing PDCP (e.g. LTE PDCP).

In the above-described embodiments, when the unified PDCP includes functions and processing different from those of the existing PDCP (i.e., MN PDCP or SN PDCP), another (sub) layer may operate in view of this difference, or the unified PDCP may operate in view of this difference. For example, while the amount of data waiting for transmission (amount of buffer) between the LTE PDCP and MAC has been defined to be "data available for transmission", it has been discussed to specify the amount of data waiting for transmission between the NR PDCP and MAC as "data volume". For example, when the NR PDCP is used as the unified PDCP, one or both of the LTE MAC and the NR PDCP (i.e., unified PDCP) in the MeNB and the UE MCG of the EN-DC may operate in view of this difference.

The MN 1 and the SN 2 described in the above embodiments may be implemented based on a Cloud Radio Access Network (C-RAN) concept. The C-RAN is also referred to as a Centralized RAN. In this case, processes and operations performed by each of the MN 1 and the SN 2 described in the above-described embodiments may be provided by a Digital Unit (DU) included in the C-RAN architecture, or by a combination of a DU and a Radio Unit (RU). The DU is also referred to as a Baseband Unit (BBU) or a Central Unit (CU). The RU is also referred to as a Remote Radio Head (RRH), a Remote Radio Equipment (RRE), a Distributed Unit (DU), or a Transmission and Reception Point (TRP). That is, processes and operations performed by each of the MN 1 and the SN 2 described in the above-described embodiments may be provided by one or more radio stations (or RAN nodes).

Further, the above-described embodiments are merely examples of applications of the technical ideas obtained by the inventor. These technical ideas are not limited to the above-described embodiments and various modifications may be made thereto.

For example, the whole or part of the above-described embodiments can be described as, but not limited to, the following supplementary notes.

(Supplementary Note 1)

A master radio access network (RAN) node associated with a master radio access technology (RAT), the master RAN node comprising:

a memory; and at least one processor coupled to the memory and configured to:

communicate with a secondary RAN node associated with a secondary RAT and provide a radio terminal with dual connectivity that uses the master RAT and the secondary RAT;

if the radio terminal does not support a split bearer, use, for a master cell group bearer for the radio terminal, a PDCP entity that provides first Packet Data Convergence Protocol (PDCP) functionalities corresponding to the master RAT; and if the radio terminal supports the split bearer, use, for the master cell group bearer for the radio terminal, a PDCP entity that provides unified PDCP functionalities, regardless of whether the dual connectivity is started for the radio terminal, wherein the unified PDCP functionalities are used for both a master cell group split bearer and a secondary cell group split bearer, the master cell group split bearer is a user plane bearer whose radio protocols are split at the master RAN node and belong to both a master cell group provided by the master RAN node and a secondary cell group provided by the secondary RAN node, the secondary cell group split bearer is a user plane bearer whose radio protocols are split at the secondary RAN node and belong to both the secondary cell group and the master cell group, and the master cell group bearer is a user plane bearer whose radio protocols are only located in the master cell group.

(Supplementary Note 2)

The master RAN node according to Supplementary Note 1, wherein the unified PDCP functionalities are common functionalities that both the first PDCP functionalities corresponding to the master RAT and second PDCP functionalities corresponding to the secondary RAT have.

(Supplementary Note 3)

The master RAN node according to Supplementary Note 1, wherein the unified PDCP functionalities are a common subset between the first PDCP functionalities corresponding to the master RAT and second PDCP functionalities corresponding to the secondary RAT.

(Supplementary Note 4)

The master RAN node according to Supplementary Note 1, wherein second PDCP functionalities corresponding to the secondary RAT are a subset of the first PDCP functionalities corresponding to the master RAT, and the unified PDCP functionalities are the same as, or a subset of, the second PDCP functionalities corresponding to the secondary RAT.

(Supplementary Note 5)

The master RAN node according to any one of Supplementary Notes 1 to 4, wherein the at least one processor is configured to receive from the radio terminal, during a Radio Resource Control (RRC) connection establishment procedure, terminal capability information indicating whether the radio terminal supports a split bearer.

(Supplementary Note 6)

The master RAN node according to Supplementary Note 5, wherein the at least one processor is configured to:

receive from the radio terminal an RRC connection request message that contains the terminal capability information; and when the terminal capability information indicates that the radio terminal supports a split bearer, transmit to the radio terminal an RRC connection setup message that contains information indicating use of the unified PDCP functionalities or contains a PDCP configuration corresponding to the unified PDCP functionalities.

(Supplementary Note 7)

The master RAN node according to Supplementary Note 6, wherein the at least one processor is configured to perform access stratum security activation with the radio terminal via a signalling radio bearer to which the PDCP configuration corresponding to the unified PDCP functionalities is applied.
(Supplementary Note 8)
The master RAN node according to any one of Supplementary Notes 5 to 7, wherein the terminal capability information is defined to be an RRC information element.
(Supplementary Note 9)
The master RAN node according to any one of Supplementary Notes 5 to 7, wherein the terminal capability information is defined to be a Medium Access Control (MAC) Control Element (CE).
(Supplementary Note 10)
The master RAN node according to any one of Supplementary Notes 5 to 7, wherein the terminal capability information is defined to be a Logical Channel ID (LCID) of a Common Control Channel (CCCH).
(Supplementary Note 11)
A radio terminal comprising:
at least one wireless transceiver configured to communicate with both a master radio access network (RAN) node associated with a master radio access technology (RAT) and a secondary RAN node associated with a secondary RAT; and
at least one processor configured to:
perform, via the at least one wireless transceiver, dual connectivity that uses the master RAT and the secondary RAT;
if the radio terminal does not support a split bearer, use, for a master cell group bearer for the radio terminal, a PDCP entity that provides first Packet Data Convergence Protocol (PDCP) functionalities corresponding to the master RAT; and
if the radio terminal supports the split bearer, use, for the master cell group bearer for the radio terminal, a PDCP entity that provides unified PDCP functionalities, regardless of whether the dual connectivity is started for the radio terminal, wherein
the unified PDCP functionalities are used for both a master cell group split bearer and a secondary cell group split bearer,
the master cell group split bearer is a user plane bearer whose radio protocols are split at the master RAN node and belong to both a master cell group provided by the master RAN node and a secondary cell group provided by the secondary RAN node,
the secondary cell group split bearer is a user plane bearer whose radio protocols are split at the secondary RAN node and belong to both the secondary cell group and the master cell group, and
the master cell group bearer is a user plane bearer whose radio protocols are only located in the master cell group.
(Supplementary Note 12)
The radio terminal according to Supplementary Note 11, wherein the at least one processor is configured to transmit to the master RAN node, during a Radio Resource Control (RRC) connection establishment procedure, terminal capability information indicating that the radio terminal supports a split bearer.
(Supplementary Note 13)
The radio terminal according to Supplementary Note 12, wherein the at least one processor is configured to:
transmit to the master RAN node an RRC connection request message that contains the terminal capability information; and
receive from the master RAN node an RRC connection setup message that contains information indicating use of the unified PDCP functionalities or contains a PDCP configuration corresponding to the unified PDCP functionalities.
(Supplementary Note 14)
The radio terminal according to Supplementary Note 13, wherein the at least one processor is configured to perform access stratum security activation with the master RAN node via a signalling radio bearer to which the PDCP configuration corresponding to the unified PDCP functionalities is applied.
(Supplementary Note 15)
A method for a master radio access network (RAN) node associated with a master radio access technology (RAT), the method comprising:
communicating with a secondary RAN node associated with a secondary RAT and providing a radio terminal with dual connectivity that uses the master RAT and the secondary RAT;
if the radio terminal does not support a split bearer, using, for a master cell group bearer for the radio terminal, a PDCP entity that provides first Packet Data Convergence Protocol (PDCP) functionalities corresponding to the master RAT; and
if the radio terminal supports the split bearer, using, for the master cell group bearer for the radio terminal, a PDCP entity that provides unified PDCP functionalities, regardless of whether the dual connectivity is started for the radio terminal, wherein
the unified PDCP functionalities are used for both a master cell group split bearer and a secondary cell group split bearer,
the master cell group split bearer is a user plane bearer whose radio protocols are split at the master RAN node and belong to both a master cell group provided by the master RAN node and a secondary cell group provided by the secondary RAN node,
the secondary cell group split bearer is a user plane bearer whose radio protocols are split at the secondary RAN node and belong to both the secondary cell group and the master cell group, and
the master cell group bearer is a user plane bearer whose radio protocols are only located in the master cell group.
(Supplementary Note 16)
A method for a radio terminal, the method comprising:
performing dual connectivity that uses a master radio access technology (RAT) and a secondary RAT via a wireless transceiver configured to communicate with both a master radio access network (RAN) node associated with the master RAT and a secondary RAN node associated with the secondary RAT;
if the radio terminal does not support a split bearer, using, for a master cell group bearer for the radio terminal, a PDCP entity that provides first Packet Data Convergence Protocol (PDCP) functionalities corresponding to the master RAT; and
if the radio terminal supports the split bearer, using, for the master cell group bearer for the radio terminal, a PDCP entity that provides unified PDCP functionalities, regardless of whether the dual connectivity is started for the radio terminal, wherein
the unified PDCP functionalities are used for both a master cell group split bearer and a secondary cell group split bearer,
the master cell group split bearer is a user plane bearer whose radio protocols are split at the master RAN node and belong to both a master cell group provided by the master RAN node and a secondary cell group provided by the secondary RAN node, the secondary cell group split bearer is a user plane bearer whose radio protocols are split at the secondary RAN node and belong to both the secondary cell group and the master cell group, and the master cell group bearer is a user plane bearer whose radio protocols are only located in the master cell group.

(Supplementary Note 17)

A program for causing a computer to perform a method for a master radio access network (RAN) node associated with a master radio access technology (RAT), wherein the method comprises:

communicating with a secondary RAN node associated with a secondary RAT and providing a radio terminal with dual connectivity that uses the master RAT and the secondary RAT;

if the radio terminal does not support a split bearer, using, for a master cell group bearer for the radio terminal, a PDCP entity that provides first Packet Data Convergence Protocol (PDCP) functionalities corresponding to the master RAT; and if the radio terminal supports the split bearer, using, for the master cell group bearer for the radio terminal, a PDCP entity that provides unified PDCP functionalities, regardless of whether the dual connectivity is started for the radio terminal, wherein the unified PDCP functionalities are used for both a master cell group split bearer and a secondary cell group split bearer, the master cell group split bearer is a user plane bearer whose radio protocols are split at the master RAN node and belong to both a master cell group provided by the master RAN node and a secondary cell group provided by the secondary RAN node, the secondary cell group split bearer is a user plane bearer whose radio protocols are split at the secondary RAN node and belong to both the secondary cell group and the master cell group, and the master cell group bearer is a user plane bearer whose radio protocols are only located in the master cell group.

(Supplementary Note 18)

A program for causing a computer to perform a method for a radio terminal, wherein the method comprises:

performing dual connectivity that uses a master radio access technology (RAT) and a secondary RAT via a wireless transceiver configured to communicate with both a master radio access network (RAN) node associated with the master RAT and a secondary RAN node associated with the secondary RAT;

if the radio terminal does not support a split bearer, using, for a master cell group bearer for the radio terminal, a PDCP entity that provides first Packet Data Convergence Protocol (PDCP) functionalities corresponding to the master RAT; and if the radio terminal supports the split bearer, using, for the master cell group bearer for the radio terminal, a PDCP entity that provides unified PDCP functionalities, regardless of whether the dual connectivity is started for the radio terminal, wherein the unified PDCP functionalities are used for both a master cell group split bearer and a secondary cell group split bearer, the master cell group split bearer is a user plane bearer whose radio protocols are split at the master RAN node and belong to both a master cell group provided by the master RAN node and a secondary cell group provided by the secondary RAN node, the secondary cell group split bearer is a user plane bearer whose radio protocols are split at the secondary RAN node and belong to both the secondary cell group and the master cell group, and the master cell group bearer is a user plane bearer whose radio protocols are only located in the master cell group.

REFERENCE SIGNS LIST

1 MASTER NODE (MN)
2 SECONDARY NODE (SN)
3 USER EQUIPMENT (UE)
4 CORE NETWORK
5 CONTROL PLANE (CP) NODE
6 USER PLANE (UP) NODE
1401 RF TRANSCEIVER
1404 PROCESSOR
1405 MEMORY
1501 RF TRANSCEIVER
1503 BASEBAND PROCESSOR
1504 APPLICATION PROCESSOR
1506 MEMORY
1602 PROCESSOR
1603 MEMORY

The invention claimed is:

1. A master radio access network (RAN) node associated with a master radio access technology (RAT), the master RAN node comprising:
a memory; and
at least one processor coupled to the memory and configured to:
communicate with a secondary RAN node associated with a secondary RAT and provide a radio terminal with dual connectivity that uses the master RAT and the secondary RAT; and
in response to receiving, from the radio terminal or a core network, terminal capability information indicating that the radio terminal supports a split bearer, use a Packet Data Convergence Protocol (PDCP) entity for a master cell group split bearer for the radio terminal, the PDCP entity providing unified PDCP functionalities, wherein:
the unified PDCP functionalities are used for both the master cell group split bearer and a secondary cell group split bearer,
the master cell group split bearer is a user plane bearer whose radio protocols are split at the master RAN node and belong to both a master cell group provided by the master RAN node and a secondary cell group provided by the secondary RAN node, and
the secondary cell group split bearer is a user plane bearer whose radio protocols are split at the secondary RAN node and belong to both the secondary cell group and the master cell group.

2. The master RAN node according to claim 1, wherein the unified PDCP functionalities are common functionalities that both first PDCP functionalities corresponding to the master RAT and second PDCP functionalities corresponding to the secondary RAT have.

3. The master RAN node according to claim 1, wherein the unified PDCP functionalities are a common subset between first PDCP functionalities corresponding to the master RAT and second PDCP functionalities corresponding to the secondary RAT.

4. The master RAN node according to claim 1, wherein:
second PDCP functionalities corresponding to the secondary RAT are a subset of first PDCP functionalities corresponding to the master RAT, and
the unified PDCP functionalities are the same as, or a subset of, the second PDCP functionalities corresponding to the secondary RAT.

5. The master RAN node according to claim 1, wherein the at least one processor is configured to prepare the PDCP entity that provides the unified PDCP functionalities by establishing, re-establishing, or reconfiguring a PDCP entity with a configuration common to both first PDCP functionalities corresponding to the master RAT and second PDCP functionalities corresponding to the secondary RAT.

6. The master RAN node according to claim 1, wherein:
the at least one processor is configured to establish, re-establish, or reconfigure a PDCP entity for an already established master cell group bearer, or to switch a mode of the PDCP entity for the master cell group bearer, in such a way that it provides the unified PDCP functionalities, thereby establishing the PDCP entity that provides the unified PDCP functionalities for the master cell group split bearer, for the secondary cell group split bearer, or for a secondary cell group bearer,
the master cell group bearer is a user plane bearer whose radio protocols are only located in the master cell group, and
the secondary cell group bearer is a user plane bearer whose radio protocols are only located in the secondary cell group.

7. The master RAN node according to claim 1, wherein:
the at least one processor is configured to, if the radio terminal supports a split bearer, use the PDCP entity that provides the unified PDCP functionalities also for a master cell group bearer for the radio terminal, regardless of whether the dual connectivity is started for the radio terminal, and
the master cell group bearer is a user plane bearer whose radio protocols are only located in the master cell group.

8. The master RAN node according to claim 7, wherein the at least one processor is configured to receive the terminal capability information from the radio terminal during a Radio Resource Control (RRC) connection establishment procedure.

9. The master RAN node according to claim 8, wherein the at least one processor is configured to:
receive from the radio terminal an RRC connection request message that contains the terminal capability information; and
when the terminal capability information indicates that the radio terminal supports a split bearer, transmit to the radio terminal an RRC connection setup message that contains information indicating use of the unified PDCP functionalities or contains a PDCP configuration corresponding to the unified PDCP functionalities.

10. The master RAN node according to claim 9, wherein the at least one processor is configured to perform access stratum security activation with the radio terminal via a signalling radio bearer to which the PDCP configuration corresponding to the unified PDCP functionalities is applied.

11. The master RAN node according to claim 8, wherein the terminal capability information is defined to be an RRC information element.

12. A secondary radio access network (RAN) node configured to support a secondary radio access technology (RAT), the secondary RAN node comprising:

a memory; and
at least one processor coupled to the memory and configured to:
communicate with a master RAN node that supports a master RAT and provide a radio terminal with dual connectivity that uses the master RAT and the secondary RAT; and
if the master RAN node receives, from the radio terminal or a core network, terminal capability information indicating that the radio terminal supports a split bearer, use a Packet Data Convergence Protocol (PDCP) entity for a secondary cell group split bearer for the radio terminal, the PDCP entity providing unified PDCP functionalities, wherein:
the unified PDCP functionalities are used for both the secondary cell group split bearer and a master cell group split bearer,
the master cell group split bearer is a user plane bearer whose radio protocols are split at the master RAN node and belong to both a master cell group provided by the master RAN node and a secondary cell group provided by the secondary RAN node, and
the secondary cell group split bearer is a user plane bearer whose radio protocols are split at the secondary RAN node and belong to both the secondary cell group and the master cell group.

13. The secondary RAN node according to claim 12, wherein:
the at least one processor is configured to establish, re-establish, or reconfigure a PDCP entity for an already established secondary cell group bearer, or switch a mode of the PDCP entity for the secondary cell group bearer, in such a way that it provides the unified PDCP functionalities, thereby establishing the PDCP entity that provides the unified PDCP functionalities for the secondary cell group split bearer, and
the secondary cell group bearer is a user plane bearer whose radio protocols are only located in the secondary cell group.

14. A radio terminal comprising:
at least one wireless transceiver configured to communicate with both a master radio access network (RAN) node associated with a master radio access technology (RAT) and a secondary RAN node associated with a secondary RAT; and
at least one processor configured to:
perform, via the at least one wireless transceiver, dual connectivity that uses the master RAT and the secondary RAT;
if the radio terminal supports a split bearer, transmit, to the master RAN node, terminal capability information indicating that the radio terminal supports a split bearer; and
if the radio terminal supports a split bearer, use a Packet Data Convergence Protocol (PDCP) entity for a master cell group split bearer for the radio terminal, the PDCP entity providing unified PDCP functionalities, wherein:
the unified PDCP functionalities are used for both the master cell group split bearer and a secondary cell group split bearer,
the master cell group split bearer is a user plane bearer whose radio protocols are split at the master RAN node and belong to both a master cell group provided by the master RAN node and a secondary cell group provided by the secondary RAN node, and the secondary cell group split bearer is a user plane bearer whose radio protocols are split at the secondary RAN node and belong to both the secondary cell group and the master cell group.

15. The radio terminal according to claim 14, wherein:
the at least one processor is configured to establish, re-establish, or reconfigure a PDCP entity for an already established master cell group bearer, or to switch a mode of the PDCP entity for the master cell group bearer, in such a way that it provides the unified PDCP functionalities, thereby establishing the PDCP entity that provides the unified PDCP functionalities for the master cell group split bearer, for the secondary cell group split bearer, or for a secondary cell group bearer,
the master cell group bearer is a user plane bearer whose radio protocols are only located in the master cell group, and
the secondary cell group bearer is a user plane bearer whose radio protocols are only located in the secondary cell group.

16. The radio terminal according to claim 14, wherein:
the at least one processor is configured to, if the radio terminal supports a split bearer, use the PDCP entity that provides the unified PDCP functionalities also for a master cell group bearer for the radio terminal, regardless of whether the dual connectivity is started for the radio terminal, and
the master cell group bearer is a user plane bearer whose radio protocols are only located in the master cell group.

17. The radio terminal according to claim 16, wherein the at least one processor is configured to transmit the terminal capability information to the master RAN node during a Radio Resource Control (RRC) connection establishment procedure.

18. The radio terminal according to claim 17, wherein the at least one processor is configured to:
transmit to the master RAN node an RRC connection request message that contains the terminal capability information; and
receive from the master RAN node an RRC connection setup message that contains information indicating use of the unified PDCP functionalities or contains a PDCP configuration corresponding to the unified PDCP functionalities.

19. The radio terminal according to claim 18, wherein the at least one processor is configured to perform access stratum security activation with the master RAN node via a signalling radio bearer to which the PDCP configuration corresponding to the unified PDCP functionalities is applied.

20. A method for a master radio access network (RAN) node associated with a master radio access technology (RAT), the method comprising:
communicating with a secondary RAN node associated with a secondary RAT and providing a radio terminal with dual connectivity that uses the master RAT and the secondary RAT; and
in response to receiving, from the radio terminal or a core network, terminal capability information indicating that the radio terminal supports a split bearer, using a Packet Data Convergence Protocol (PDCP) entity for a master cell group split bearer for the radio terminal, the PDCP entity providing unified PDCP functionalities, wherein:
the unified PDCP functionalities are used for both the master cell group split bearer and a secondary cell group split bearer,
the master cell group split bearer is a user plane bearer whose radio protocols are split at the master RAN node and belong to both a master cell group provided by the master RAN node and a secondary cell group provided by the secondary RAN node, and
the secondary cell group split bearer is a user plane bearer whose radio protocols are split at the secondary RAN node and belong to both the secondary cell group and the master cell group.

\* \* \* \* \*